(12) United States Patent
Gao et al.

(10) Patent No.: US 12,499,974 B2
(45) Date of Patent: Dec. 16, 2025

(54) QUALITY DETECTION OF VARIANT CALLING USING A MACHINE LEARNING CLASSIFIER

(71) Applicant: Illumina, Inc., San Diego, CA (US)

(72) Inventors: Hong Gao, Palo Alto, CA (US); Tobias Hamp, Cambridge (GB); Joshua Goodwin Jon Mcmaster-Schraiber, Berkeley, CA (US); Laksshman Sundaram, Fremont, CA (US); Kai-How Farh, Hillsborough, CA (US)

(73) Assignee: Illumina, Inc., San Diego, CA (US)

( * ) Notice: Subject to any disclaimer, the term of this patent is extended or adjusted under 35 U.S.C. 154(b) by 601 days.

(21) Appl. No.: 17/952,194

(22) Filed: Sep. 23, 2022

(65) Prior Publication Data

US 2023/0207058 A1 Jun. 29, 2023

Related U.S. Application Data

(60) Provisional application No. 63/294,828, filed on Dec. 29, 2021, provisional application No. 63/294,813, (Continued)

(51) Int. Cl.
*G16B 30/00* (2019.01)
*G06F 18/2111* (2023.01)
(Continued)

(52) U.S. Cl.
CPC .......... *G16B 30/00* (2019.02); *G06F 18/2111* (2023.01); *G06F 18/2148* (2023.01);
(Continued)

(58) Field of Classification Search
CPC ........ G16B 30/00; G16B 30/10; G16B 20/20; G16B 10/00; G16B 40/00; G16B 40/30;
(Continued)

(56) References Cited

U.S. PATENT DOCUMENTS 5,869,036 A * 2/1999 Belshe ..................... A61P 31/16
435/235.1
6,110,457 A * 8/2000 Belshe ................. C07K 14/005
435/235.1
(Continued)

FOREIGN PATENT DOCUMENTS

| CA | 3066775 A1 | 4/2019 |
| WO | 2012-034030 A1 | 3/2012 |
| WO | 2021-077163 A1 | 4/2021 |

OTHER PUBLICATIONS

Pollard Katherine S. et al: "Detection of nonneutral substitution rates on mammalian phylogenies", Genome Research, vol. 20, No. 1, Oct. 26, 2009 (Oct. 26, 2009), pp. 110-121, XP093111876, US ISSN: 1088-9051, DOI: 10.1101/gr.097857.109.
(Continued)

*Primary Examiner* — David E Choi
(74) *Attorney, Agent, or Firm* — ILLUMINA, INC.

(57) ABSTRACT

The technology disclosed relates to variant calling of sequenced reads of a sample of a target species against a reference genome of a pseudo-target species. Low-quality variants are identified as false positive variants that are present in the second set of variants but absent from the first set of variants.

25 Claims, 29 Drawing Sheets

Related U.S. Application Data filed on Dec. 29, 2021, provisional application No. 63/294,830, filed on Dec. 29, 2021, provisional application No. 63/294,827, filed on Dec. 29, 2021, provisional application No. 63/294,816, filed on Dec. 29, 2021, provisional application No. 63/294,820, filed on Dec. 29, 2021.

(51) Int. Cl.

| | |
|---|---|
| *G06F 18/214* | (2023.01) |
| *G06N 3/045* | (2023.01) |
| *G06N 3/08* | (2023.01) |
| *G06N 3/126* | (2023.01) |
| *G06N 20/00* | (2019.01) |
| *G06N 20/20* | (2019.01) |
| *G16B 10/00* | (2019.01) |
| *G16B 20/00* | (2019.01) |
| *G16B 20/20* | (2019.01) |
| *G16B 20/40* | (2019.01) |
| *G16B 30/10* | (2019.01) |
| *G16B 40/00* | (2019.01) |
| *G16B 40/20* | (2019.01) |
| *G16B 40/30* | (2019.01) |
| *G16B 50/10* | (2019.01) |

(52) U.S. Cl.
CPC ......... *G06F 18/2155* (2023.01); *G06N 3/045* (2023.01); *G06N 3/08* (2013.01); *G06N 3/126* (2013.01); *G06N 20/00* (2019.01); *G06N 20/20* (2019.01); *G16B 10/00* (2019.02); *G16B 20/00* (2019.02); *G16B 20/20* (2019.02); *G16B 20/40* (2019.02); *G16B 30/10* (2019.02); *G16B 40/00* (2019.02); *G16B 40/20* (2019.02); *G16B 40/30* (2019.02); *G16B 50/10* (2019.02)

(58) Field of Classification Search
CPC ........ G16B 50/10; G16B 20/00; G16B 20/40; G16B 40/20; G06N 20/00; G06N 3/045; G06N 3/08; G06N 3/126; G06F 18/2111; G06F 18/2148; G06F 18/2155

See application file for complete search history.

(56) References Cited

U.S. PATENT DOCUMENTS

| | | | |
|---|---|---|---|
| 10,354,747 B1 | 7/2019 | Depristo et al. | |
| 2007/0071720 A1* | 3/2007 | Janssen | A61K 47/60 514/43 |
| 2014/0302042 A1* | 10/2014 | Chin | G01N 33/57484 424/139.1 |
| 2015/0363546 A1 | 12/2015 | Delaney et al. | |
| 2018/0300450 A1* | 10/2018 | Hogan | G16B 20/10 |
| 2019/0073445 A1* | 3/2019 | Shen | G16B 20/20 |
| 2019/0266493 A1 | 8/2019 | Gao et al. | |
| 2019/0318806 A1 | 10/2019 | Wise et al. | |
| 2019/0359990 A1* | 11/2019 | Tuller | G16B 25/10 |
| 2020/0020416 A1* | 1/2020 | Artieri | G16B 30/00 |
| 2020/0097835 A1 | 3/2020 | Silver et al. | |
| 2020/0265922 A1* | 8/2020 | Rabizadeh | G16B 45/00 |
| 2021/0343372 A1 | 11/2021 | Tell et al. | |
| 2022/0056502 A1* | 2/2022 | Li | C12Q 1/6869 |
| 2022/0084631 A1* | 3/2022 | Ju | G16B 40/20 |
| 2023/0207058 A1* | 6/2023 | Gao | G16B 30/00 706/12 |

OTHER PUBLICATIONS

H. Gao et al. "The landscape of tolerated genetic variation in human and primates", Science 380, eabn8197 (2023) DOI: 10.1126/science.abn8197.

A. B. Rylands, R. A. Mittermeier, Primate Behavioral Ecology. (Routledge, New York, ed. 6, 2021), pp. 407-428.
A. Bentivegna et al., Rubinstein-Taybi Syndrome: spectrum of CREBBP mutations in Italian patients. BMC Med Genet 7, 77 (2006).
A. Estrada et al., Impending extinction crisis of the world's primates: Why primates matter. Sci Adv 3, e1600946 (2017).
A. Eyre-Walker, P. D. Keightley, The distribution of fitness effects of new mutations. Nature Reviews Genetics 8, 610-618 (2007).
A. J. Riesselman, J. B. Ingraham, D. S. Marks, Deep generative models of genetic variation capture the effects of mutations. Nat Methods 15, 816-822 (2018).
A. O. Giacomelli et al., Mutational processes shape the landscape of TP53 mutations in human cancer. Nature Genetics 50, 1381-1387 (2018).
A. R. Martin et al., PanelApp crowdsources expert knowledge to establish consensus diagnostic gene panels. Nat Genet 51, 1560-1565 (2019).
A. Sali, T. L. Blundell, Comparative protein modelling by satisfaction of spatial restraints. J Mol Biol 234, 779-815 (1993).
A. S. Kondrashov, S. Sunyaev, F. A. Kondrashov, Dobzhansky-Muller incompatibilities in protein evolution. Proc. Natl. Acad. Sci. U.S.A.99, 14878-14883 (2002).
A. Thormann et al., Flexible and scalable diagnostic filtering of genomic variants using G2P with Ensembl VEP. Nat Commun 10, 2373 (2019).
B. E. Suzek, H. Huang, P. McGarvey, R. Mazumder, C. H. Wu, UniRef: comprehensive and non-redundant UniProt reference clusters. Bioinformatics 23, 1282-1288 (2007).
B. E. Suzek, Y. Wang, H. Huang, P. B. McGarvey, C. H. Wu, UniRef clusters: a comprehensive and scalable alternative for improving sequence similarity searches. Bioinformatics (Oxford, England) 31, 926-932 (2015).
B. Heidenreich, R. Kumar, TERT promoter mutations in telomere biology. Mutation Research/Reviews in Mutation Research 771, 15-31 (2017).
B. J. Evans et al., Speciation over the edge: gene flow among non-human primate species across a formidable biogeographic barrier. R Soc Open Sci. 4, 170351 (2017).
B. J. O'Roak et al., Sporadic autism exomes reveal a highly interconnected protein network of de novo mutations. Nature 485, 246-250 (2012).
B.-J. Feng, Perch: A Unified Framework for Disease Gene Prioritization. Human Mutation 38, 243-251 (2017).
B. Quintáns, A. Ordóñez-Ugalde, P. Cacheiro, A. Carracedo, M. J. Sobrido, Medical genomics: The intricate path from genetic variant identification to clinical interpretation. Appl. Transl. Genomics3, 60-67 (2014).
C. A. Cassa et al., Estimating the selective effects of heterozygous protein-truncating variants from human exome data. Nat Genet 49, 806-810 (2017).
C. Bycroft et al., The UK Biobank resource with deep phenotyping and genomic data. Nature 562, 203-209 (2018).
C. D. Bustamante, J. Wakeley, S. Sawyer, D. L. Hartl, Directional selection and the site-frequency spectrum. Genetics 159, 1779-1788 (2001).
C. E. G. Amorim, Z. Gao, Z. Baker, J. F. Diesel, Y. B. Simons, I. S. Haque, J. Pickrell, M. Przeworski, The population genetics of human disease: The case of recessive, lethal mutations. PLOS Genet.13, e1006915 (2017).
C. L. Araya et al., A fundamental protein property, thermodynamic stability, revealed solely from large-scale measurements of protein function. Proceedings of the National Academy of Sciences 109, 16858-16863 (2012).
C. Nakanishi et al., Germline mutation of the LKB1/STK11 gene with loss of the normal allele in an aggressive breast cancer of Peutz-Jeghers syndrome. Oncology 67, 476-479 (2004).
C. S. A. Consortium, Initial sequence of the chimpanzee genome and comparison with the human genome. Nature 437, 69-87 (2005).
C. Sudlow et al., UK biobank: an open access resource for identifying the causes of a wide range of complex diseases of middle and old age. PLoS Med 12, e1001779 (2015).

(56) References Cited

OTHER PUBLICATIONS

C. Tyner et al., The UCSC Genome Browser database: 2017 update. Nucleic Acids Res 45, D626-D634 (2017).
C. Zoonomia, A comparative genomics multitool for scientific discovery and conservation. Nature 587, 240-245 (2020).
D. Bates, M. Mächler, B. Bolker, S. Walker, Fitting Linear Mixed-Effects Models Using lme4. Journal of Statistical Software, 67, 1-48 (2015).
D. E. Reich, E. S. Lander, On the allelic spectrum of human disease. Trends Genet 17, 502-510 (2001).
D. G. MacArthur et al., Guidelines for investigating causality of sequence variants in human disease. Nature 508, 469-476 (2014).
D. Hendrycks, K. Gimpel, Gaussian Error Linear Units (GELUs). arXiv:1606.08415 [cs.LG] (2020).
D. J. Burgess, The TOPMed genomic resource for human health. Nat Rev Genet 22, 200 (2021).
D. Kingma, J. Ba, Adam: A method for stochastic optimization. arXiv:1412.6980 [cs.LG] (2007).
D. M. Jordan, S. G. Frangakis, C. Golzio, C. A. Cassa, J. Kurtzberg, E. E. Davis, S. R. Sunyaev, N. Katsanis; Task Force for Neonatal Genomics, Identification of cis-suppression of human disease mutations by comparative genomics. Nature524, 225-229 (2015).
D. Quang, Y. Chen, X. Xie, Dann: a deep learning approach for annotating the pathogenicity of genetic variants. Bioinformatics 31, 761-763 (2015).
D. Raimondi et al., DEOGEN2: prediction and interactive visualization of single amino acid variant deleteriousness in human proteins. Nucleic Acids Research 45, W201-W206 (2017).
D. S. Marks, L. J. Colwell, R. Sheridan, T. A. Hopf, A. Pagnani, R. Zecchina, C. Sander, Protein 3D structure computed from evolutionary sequence variation. Plos ONE6, e28766 (2011).
D. Taliun et al., Sequencing of 53,831 diverse genomes from the NHLBI TOPMed Program. Nature 590, 290-299 (2021).
D. Vanderpool et al., Primate phylogenomics uncovers multiple rapid radiations and ancient interspecific introgression. PLoS Biol 18, e3000954 (2020).
Deciphering Developmental Disorders Study, Large-scale discovery of novel genetic causes of developmental disorders. Nature 519, 223-228 (2015).
Deciphering Developmental Disorders Study, Prevalence and architecture of de novo mutations in developmental disorders. Nature 542, 433-438 (2017).
Dissertation et al: "Advanced Strategies for Alignment-based Real-time Analysis and Data Protection in Next-Generation Sequencing", Jan. 1, 2019 (Jan. 1, 2019), XP055870509, Retrieved from the Internet: URL: https://refubium.fu-berlin.de/bitstream/handle/fub188/26717/Dissertation_Loka.pdf?sequence=3&isAllowed=y [retrieved on Dec. 8, 2021].
Du Yuxuan et al: "HiCBin: binning metagenomic contigs and recovering metagenome-assembled genomes using Hi-C contact maps", Genome Biology, vol. 23, No. 1, Jan. 2, 2022 (Jan. 2, 2022), XP093055152, DOI: 10.1186/s13059-022-02626-w Retrieved from the Internet: URL: https://genomebiology.biomedcentral.com/counter/pdf/10.1186/s13059-022-02626-w.pdf.
E. M. Jones et al., Structural and functional characterization of G protein-coupled receptors with deep mutational scanning. eLife 9, e54895 (2020).
E. M. Leffler et al., Revisiting an old riddle: what determines genetic diversity levels within species? PLoS Biol 10, e1001388 (2012).
E. M. Leffler, Z. Gao, S. Pfeifer, L. Ségurel, A. Auton, O. Venn, R. Bowden, R. Bontrop, J. D. Wall, G. Sella, P. Donnelly, G. McVean, M. Przeworski, Multiple instances of ancient balancing selection shared between humans and chimpanzees. Science339, 1578-1582 (2013).
G. B. Pier et al., *Salmonella typhi* uses CFTR to enter intestinal epithelial cells. Nature 393, 79-82 (1998).
Gao Fei et al: "Direct ChIP-bisulfite sequencing reveals a role of H3K27me3 mediating aberrant hypermethylation of promoter CpG islands in cancer cells", Genomics, vol. 103, No. 2, pp. 204-210, XP028847145, ISSN: 0888-7543, DOI: 10.1016/J.YGENO.2013.12.006.
H. A. Shihab et al., An integrative approach to predicting the functional effects of non-coding and coding sequence variation. Bioinformatics 31, 1536-1543 (2015).
H. Carter, C. Douville, P. D. Stenson, D. N. Cooper, R. Karchin, Identifying Mendelian disease genes with the variant effect scoring tool. BMC Genomics14, S3 (2013).
H. D. Chae, C. H. Jeon, Peutz-Jeghers syndrome with germline mutation of STK11. Ann Surg Treat Res 86, 325-330 (2014).
H. L. Rehm et al., ClinGen—the Clinical Genome Resource. N Engl J Med 372, 2235-2242 (2015).
H. L. Rehm, Evolving health care through personal genomics. Nat Rev Genet 18, 259-267 (2017).
H. R. Yang, J. S. Ko, J. K. Seo, Germline mutation analysis of STK11 gene using direct sequencing and multiplex ligation-dependent probe amplification assay in Korean children with Peutz-Jeghers syndrome. Dig Dis Sci 55, 3458-3465 (2010).
H. Shu et al., The role of CD36 in cardiovascular disease. Cardiovascular Research, (2020).
Hemang Parikh et al: "svclassify: a method to establish benchmark structural variant calls", BMC Genomics, Biomed Central Ltd, London, UK, vol. 17, No. 1, Jan. 16, 2016 (Jan. 16, 2016), pp. 1-16, XP021233233, DOI: 10.1186/S12864-016-2366-2.
Henikoff S et al: "Position-based sequence weights", Journal of Molecular Biology, Academic Press, United Kingdom, vol. 243, No. 4, Nov. 4, 1994 (Nov. 4, 1994), pp. 574-578, XP024011362, ISSN: 0022-2836, DOI: 10.1016/0022-2836(94)90032-9 [retrieved on Nov. 4, 1994].
Hopf Thomas et al: "Mutation effects predicted from sequence co-variation", Nature Biotechnology, vol. 35, No. 2, Jan. 16, 2017, pp. 128-135, XP093038943, New York ISSN: 1087-0156, DOI: 10.1038/nbt.3769, Retrieved from the Internet: URL: http://www.nature.com/articles/nbt3769>.
I. A. Adzhubei et al., A method and server for predicting damaging missense mutations. Nature Methods 7, 248-249 (2010).
I. Hernan et al., De novo germline mutation in the serine-threonine kinase STK11/LKB1 gene associated with Peutz-Jeghers syndrome. Clin Genet 66, 58-62 (2004).
I. Iossifov et al., De novo gene disruptions in children on the autistic spectrum. Neuron 74, 285-299 (2012).
I. Iossifov et al., The contribution of de novo coding mutations to autism spectrum disorder. Nature 515, 216-221 (2014).
I. Mathieson, G. McVean, Demography and the age of rare variants. PLOS Genet.10, e1004528 (2014).
J. A. SoRelle, D. M. Thodeson, S. Arnold, G. Gotway, J. Y. Park, Clinical Utility of Reinterpreting Previously Reported Genomic Epilepsy Test Results for Pediatric Patients. JAMA Pediatr 173, e 182302 (2019).
J. Devlin, M.-W. Chang, K. Lee, K. Toutanova, Bert: Pre-training of Deep Bidirectional Transformers for Language Understanding. Proceedings of the 2019 Conference of the North American Chapter of the Association for Computational Linguistics: Human Language Technologies, vol. 1 (Long and Short Papers) (Association for Computational Linguistics, 2019). pp. 4171-4186 (2019).
J. E. Common, W.-L. Di, D. Davies, D. P. Kelsell, Further evidence for heterozygote advantage of GJB2 deafness mutations: a link with cell survival. Journal of medical genetics 41, 573-575 (2004).
J. Frazer et al., Disease variant prediction with deep generative models of evolutionary data. Nature 599, 91-95 (2021).
J. Jouganous, W. Long, A. P. Ragsdale, S. Gravel, Inferring the Joint Demographic History of Multiple Populations: Beyond the Diffusion Approximation. Genetics 206, 1549-1567 (2017).
J. Jumper et al., Highly accurate protein structure prediction with AlphaFold. Nature 596, 583-589 (2021).
J. Kaplanis et al., Evidence for 28 genetic disorders discovered by combining healthcare and research data. Nature 586, 757-762 (2020).
J. L. Ba, J. R. Kiros, G. E. Hinton, paper presented at the Advances in NIPS 2016 Deep Learning Symposium, Barcelona, Spain, Dec. 8, 2016.

(56) References Cited

OTHER PUBLICATIONS

J. L. Bobadilla, M. Macek Jr., J. P. Fine, P. M. Farrell, Cystic fibrosis: a worldwide analysis of CFTR mutations-correlation with incidence data and application to screening. Human mutation 19, 575-606 (2002).

J. Liu et al., Distribution of CD36 deficiency in different Chinese ethnic groups. Human Immunology 81, 366-371 (2020).

J. Meier et al., Language models enable zero-shot prediction of the effects of mutations on protein function. 2021.07.09.450648 [Preprint] (2021).

J. Prado-Martinez et al., Great ape genome diversity and population history. Nature 499, 471-475 (2013).

J. Söding, A. Biegert, A. N. Lupas, The HHpred interactive server for protein homology detection and structure prediction. Nucleic Acids Research 33, W244-W248 (2005).

J. Weile et al., A framework for exhaustively mapping functional missense variants. Mol Syst Biol 13, 957 (2017).

J. Y. An et al., Genome-wide de novo risk score implicates promoter variation in autism spectrum disorder. Science 362, (2018).

J. Yang et al., Improved protein structure prediction using predicted interresidue orientations. Proc Natl Acad Sci U S A 117, 1496-1503 (2020).

Jing Yu et al: "Detection of EP300-ZNF384 fusion in patients with acute lymphoblastic leukemia using RNA fusion gene panel sequencing", Annals of Hematology, Berlin, DE, vol. 99, No. 11, Sep. 26, 2020 (Sep. 26, 2020), pp. 2611-2617, XP037261202, ISSN: 0939-5555, DOI: 10.1007 /S00277-020-04251-8 [retrieved on Sep. 26, 2020].

K. A. Jagadeesh et al., M-CAP eliminates a majority of variants of uncertain significance in clinical exomes at high sensitivity. Nature Genetics 48, 1581-1586 (2016).

K. A. Matreyek et al., Multiplex assessment of protein variant abundance by massively parallel sequencing. Nature Genetics 50, 874-882 (2018).

K. E. Eilertson, J. G. Booth, C. D. Bustamante, SnIPRE: Selection Inference Using a Poisson Random Effects Model. PLoS Comput Biol 8, e1002806 (2012).

K. E. Samocha et al., A framework for the interpretation of de novo mutation in human disease. Nat Genet 46, 944-950 (2014).

K. J. Karczewski et al., The mutational constraint spectrum quantified from variation in 141,456 humans. Nature 581, 434-443 (2020).

K. Reinson et al., Biallelic CACNA1A mutations cause early onset epileptic encephalopathy with progressive cerebral, cerebellar, and optic nerve atrophy. Am J Med Genet A 170, 2173-2176 (2016).

Kuck Patrick et al: "Parametric and non-parametric masking of randomness in sequence alignments can be improved and leads to better resolved trees", Frontiers in Zoology, Open Access Methodology, vol. 7, No. 10, Jan. 1, 2010, XP093043895, Retrieved from the Internet: URL: https://frontiersinzoology.biomedcentral.com/articles/10.1186/1742-9994-7-10 [retrieved on May 3, 2023].

L. Brenan et al., Phenotypic Characterization of a Comprehensive Set of MAPK1/ERK2 Missense Mutants. Cell Rep 17, 1171-1183 (2016).

L. Damaj et al., CACNA1A haploinsufficiency causes cognitive impairment, autism and epileptic encephalopathy with mild cerebellar symptoms. Eur J Hum Genet 23, 1505-1512 (2015).

L. F. Kuderna et al., A global catalog of whole-genome diversity from 233 primate species. bioRxiv 2023.05.02.538995 [Preprint] (2023).

L. M. Starita et al., Massively Parallel Functional Analysis of BRCA1 Ring Domain Variants. Genetics 200, 413-422 (2015).

L. S. Johnson, S. R. Eddy, E. Portugaly, Hidden Markov model speed heuristic and iterative HMM search procedure. BMC Bioinformatics 11, 431 (2010).

L. Sundaram et al., Predicting the clinical impact of human mutation with deep neural networks. Nat Genet 50, 1161-1170 (2018).

L. Wang et al., A high-quality genome assembly for the endangered golden snub-nosed monkey (*Rhinopithecus roxellana*). Gigascience 8, (2019).

L. Yu et al., Genomic analysis of snub-nosed monkeys (*Rhinopithecus*) identifies genes and processes related to high-altitude adaptation. Nat Genet 48, 947-952 (2016).

L. Zhang et al., SLCO1B1: Application and Limitations of Deep Mutational Scanning for Genomic Missense Variant Function. Drug Metab Dispos, DMD-AR-2020-000264 (2021).

M. A. Chiasson et al., Multiplexed measurement of variant abundance and activity reveals VKOR topology, active site and human variant impact. eLife 9, (2020).

M. A. Eberle et al., A reference data set of 5.4 million phased human variants validated by genetic inheritance from sequencing a three-generation 17-member pedigree. Genome Res 27, 157-164 (2017).

M. Baek et al., Accurate prediction of protein structures and interactions using a three-track neural network. Science 373, 871-876 (2021).

M. de Manuel et al., Chimpanzee genomic diversity reveals ancient admixture with bonobos. Science 354, 477-481 (2016).

M. Ekeberg, C. Lövkvist, Y. Lan, M. Weigt, E. Aurell, Improved contact prediction in proteins: Using pseudolikelihoods to infer Potts models. Physical Review E 87, 012707 (2013).

M. H. Chaleshtori et al., High carrier frequency of the GJB2 mutation (35delG) in the north of Iran. International journal of pediatric otorhinolaryngology 71, 863-867 (2007).

M. J. Landrum et al., ClinVar: public archive of interpretations of clinically relevant variants. Nucleic Acids Res 44, D862-868 (2016).

M. Kallberg et al., Template-based protein structure modeling using the RaptorX web server. Nat Protoc 7, 1511-1522 (2012).

M. Lek et al., Analysis of protein-coding genetic variation in 60,706 humans. Nature 536, 285-291 (2016).

M. M. Awad et al., Acquired Resistance to KRASG12C Inhibition in Cancer. New England Journal of Medicine 384, 2382-2393 (2021).

M. Mirdita et al., Uniclust databases of clustered and deeply annotated protein sequences and alignments. Nucleic Acids Research 45, D170-D176 (2017).

M. Seuma, A. J. Faure, M. Badia, B. Lehner, B. Bolognesi, The genetic landscape for amyloid beta fibril nucleation accurately discriminates familial Alzheimer's disease mutations. eLife 10, e63364 (2021).

M. Slatkin, A population-genetic test of founder effects and implications for Ashkenazi Jewish diseases. The American Journal of Human Genetics 75, 282-293 (2004).

M. Stef et al., Spectrum of CREBBP gene dosage anomalies in Rubinstein-Taybi syndrome patients. Eur J Hum Genet 15, 843-847 (2007).

M. Steinegger et al., HH-suite3 for fast remote homology detection and deep protein annotation. BMC Bioinformatics 20, 473 (2019).

M. Varadi et al., AlphaFold Protein Structure Database: massively expanding the structural coverage of protein-sequence space with high-accuracy models. Nucleic Acids Research, (2021).

N. M. Ioannidis et al., REVEL: An Ensemble Method for Predicting the Pathogenicity of Rare Missense Variants. Am J Hum Genet 99, 877-885 (2016).

N. Malhis, M. Jacobson, S. J. M. Jones, J. Gsponer, LIST-S2: taxonomy based sorting of deleterious missense mutations across species. Nucleic Acids Research 48, W154-W161 (2020).

N. Osada, K. Matsudaira, Y. Hamada, S. Malaivijitnond, Testing sex-biased admixture origin of macaque species using autosomal and X-chromosomal genomic sequences. Genome Biol. Evol. 13, (2021).

N. Shah et al., Identification of Misclassified ClinVar Variants via Disease Population Prevalence. Am J Hum Genet 102, 609-619 (2018).

N. Srivastava, G. Hinton, A. Krizhevsky, I. Sutskever, R. Salakhutdinov, Dropout: A Simple Way to Prevent Neural Networks from Overfitting. Journal of Machine Learning Research 15, 1929-1958 (2014).

N. Whiffin et al., using high-resolution variant frequencies to empower clinical genome interpretation. Genet Med 19, 1151-1158 (2017).

N.-L. Sim et al., SIFT web server: predicting effects of amino acid substitutions on proteins. Nucleic Acids Research 40, W452-457 (2012).

(56) References Cited

OTHER PUBLICATIONS

O. Campuzano et al., Reanalysis and reclassification of rare genetic variants associated with inherited arrhythmogenic syndromes. EBioMedicine 54, 102732 (2020).

P. Bandaru et al., Deconstruction of the Ras switching cycle through saturation mutagenesis. Elife 6, (2017).

P. D. Stenson et al., The Human Gene Mutation Database: building a comprehensive mutation repository for clinical and molecular genetics, diagnostic testing and personalized genomic medicine. Hum Genet 133, 1-9 (2014).

P. D. Stenson, E. Ball, K. Howells, A. Phillips, M. Mort, D. N. Cooper, Human Gene Mutation Database: Towards a comprehensive central mutation database. J. Med. Genet.45, 124-126 (2008).

P. D. Stenson, M. Mort, E. V. Ball, M. Chapman, K. Evans, L. Azevedo, M. Hayden, S. Heywood, D. S. Millar, A. D. Phillips, D. N. Cooper, The Human Gene Mutation Database (HGMD®): Optimizing its use in a clinical diagnostic or research setting. Hum. Genet.139, 1197-1207 (2020).

P. D'Adamo et al., Does epidermal thickening explain GJB2 high carrier frequency and heterozygote advantage? European Journal of Human Genetics 17, 284-286 (2009).

P. Fiziev, e. al., Rare penetrant mutations confer severe risk of common diseases; Science; Jun. 2, 2023; vol. 380, Issue 6648; DOI: 10.1126/science.abo1131.

P. J. Cock et al., Biopython: freely available Python tools for computational molecular biology and bioinformatics. Bioinformatics 25, 1422-1423 (2009).

P. K. Albers, G. McVean, Dating genomic variants and shared ancestry in population-scale sequencing data. PLoS biology 18, e3000586 (2020).

P. Micikevicius et al., Mixed Precision Training. International Conference on Learning Representations, (2018).

P. Rentzsch, M. Schubach, J. Shendure, M. Kircher, CADD-Splice-improving genome-wide variant effect prediction using deep learning-derived splice scores. Genome Medicine 13, 31 (2021).

R. Do et al., No evidence that selection has been less effective at removing deleterious mutations in Europeans than in Africans. Nature Genetics 47, 126-131 (2015).

R. K. Pasumarthi et al., TF-Ranking: Scalable TensorFlow Library for Learning-to-Rank. Proceedings of the 25th ACM SIGKDD International Conference on Knowledge Discovery and Data Mining, 2970-2978 (2019).

R. K. Rowntree, A. Harris, The phenotypic consequences of CFTR mutations. Annals of human genetics 67, 471-485 (2003).

R. L. Nussbaum, H. L. Rehm, ClinGen, ClinGen and Genetic Testing. N Engl J Med 373, 1379 (2015).

R. M. Rao, J. Liu, R. Verkuil, J. Meier, J. Canny, p. Abbeel, T. Sercu, A. Rives, MSA Transformer in Proceedings of the 38th International Conference on Machine Learning, pp. 8844-8856 (2021).

R. N. Gutenkunst, R. D. Hernandez, S. H. Williamson, C. D. Bustamante, Inferring the joint demographic history of multiple populations from multidimensional SNP frequency data. PLoS Genet 5, e1000695 (2009).

R. Steinhaus et al., MutationTaster2021. Nucleic Acids Research 49, W446-W451 (2021).

R. W. Newberry, J. T. Leong, E. D. Chow, M. Kampmann, W. F. DeGrado, Deep mutational scanning reveals the structural basis for α-synuclein activity. Nature Chemical Biology 16, 653-659 (2020).

S. A. Sawyer, D. L. Hartl, Population genetics of polymorphism and divergence. Genetics 132, 1161-1176 (1992).

S. A. Schroeder, D. M. Gaughan, M. Swift, Protection against bronchial asthma by CFTR delta F508 mutation: a heterozygote advantage in cystic fibrosis. Nature medicine 1, 703-705 (1995).

S. A. Wilcox et al., High frequency hearing loss correlated with mutations in the GJB2 gene. Human genetics 106, 399-405 (2000).

S. C. Jin et al., Contribution of rare inherited and de novo variants in 2,871 congenital heart disease probands. Nat Genet 49, 1593-1601 (2017).

S. Caspar et al., Clinical sequencing: from raw data to diagnosis with lifetime value. Clinical genetics 93, 508-519 (2018).

S. De Rubeis et al., Synaptic, transcriptional and chromatin genes disrupted in autism. Nature 515, 209-215 (2014).

S. E. Bojesen et al., Multiple independent variants at the TERT locus are associated with telomere length and risks of breast and ovarian cancer. Nature genetics 45, 371-384 (2013).

S. F. Altschul, W. Gish, W. Miller, E. W. Myers, D. J. Lipman, Basic local alignment search tool. J Mol Biol 215, 403-410 (1990).

S. Gudmundsson et al., Genome Aggregation Database Consortium, Addendum: The mutational constraint spectrum quantified from variation in 141,456 humans. Nature 597, E3-E4 (2021).

S. J. Sanders et al., De novo mutations revealed by whole-exome sequencing are strongly associated with autism. Nature 485, 237-241 (2012).

S. J. Sanders et al., Insights into Autism Spectrum Disorder Genomic Architecture and Biology from 71 Risk Loci. Neuron 87, 1215-1233 (2015).

S. Rajbhandari, J. Rasley, O. Ruwase, Y. He, "ZeRO: Memory Optimizations Toward Training Trillion Parameter Models" in Proceedings of the International Conference for High Performance Computing, Networking, Storage and Analysis. (IEEE Press, 2020), pp. 1-16.

S. Richards et al., Standards and guidelines for the interpretation of sequence variants: a joint consensus recommendation of the American College of Medical Genetics and Genomics and the Association for Molecular Pathology. Genet Med 17, 405-424 (2015).

S. Wang, W. Li, S. Liu, J. Xu, RaptorX-Property: a web server for protein structure property prediction. Nucleic Acids Res 44, W430-435 (2016).

Schubert Benjamin et al: "Genome-wide discovery of epistatic loci affecting antibiotic resistance in Neisseria gonorrhoeae using evolutionary couplings", Nature Microbiology, Nature Publishing Group UK, London, vol. 4, No. 2, Dec. 3, 2018 (Dec. 3, 2018), pp. 328-338, XP036679933, DOI: 10.1038/S41564-018-0309-1.

Shan Gao et al: "Prediction of function changes associated with single-point protein mutations using support vector machines (SVMs)", Human Mutation, John Wiley & Sons, Inc, US, vol. 30, No. 8, May 20, 2009 (May 20, 2009), pp. 1161-1166,.

Smith Benjamin et al: "Sequence Imputation of HPV16 Genomes for Genetic Association Studies", PLOS ONE, [Online] vol. 6, No. 6, Jun. 23, 2011 (Jun. 23, 2011), p. e21375, XP093039157, DOI: 10.1371/journal.pone.0021375 Retrieved from the Internet: URL: https://journals.plos.org/plosone/article/file?id=10.1371/journal.pone.0021375&type=printable > [retrieved on Apr. 21, 2023].

T. J. Aitman et al., Malaria susceptibility and CD36 mutation. Nature 405, 1015-1016 (2000).

T. L. Mighell, S. Evans-Dutson, B. J. O'Roak, A Saturation Mutagenesis Approach to Understanding PTEN Lipid Phosphatase Activity and Genotype-Phenotype Relationships. American journal of human genetics 102, 943-955 (2018).

T. Ohta, Slightly deleterious mutant substitutions in evolution. Nature 246, 96-98 (1973).

V. E. Gray et al., Elucidating the Molecular Determinants of Aβ Aggregation with Deep Mutational Scanning. G3 (Bethesda) 9, 3683-3689 (2019).

W. Fu et al., Analysis of 6,515 exomes reveals the recent origin of most human protein-coding variants. Nature 493, 216-220 (2013).

W. J. Kent, C. W. Sugnet, T. S. Furey, K. M. Roskin, T. H. Pringle, A.M. Zahler, D. Haussler, The human genome browser at UCSC. Genome Res. 12, 996-1006 (2002).

Wu Martin et al: "Accounting for Alignment Uncertainty in Phylogenomics", PLOS ONE, vol. 7, No. 1, Jan. 17, 2012, p. e30288, XP093044217, DOI: 10.1371/journal.pone.0030288.

X. Huang et al., Inferring genome-wide correlations of mutation fitness effects between populations. Molecular Biology and Evolution.

X. Jia et al., Massively parallel functional testing of MSH2 missense variants conferring Lynch syndrome risk. American journal of human genetics 108, 163-175 (2021).

X. Liu, C. Li, C. Mou, Y. Dong, Y. Tu, dbNSFP v4: a comprehensive database of transcript-specific functional predictions and annotations for human nonsynonymous and splice-site SNVs. Genome Medicine 12, 103 (2020).

(56) References Cited

OTHER PUBLICATIONS

X. Liu, C. Wu, C. Li, E. Boerwinkle, dbNSFP v3.0: A One-Stop Database of Functional Predictions and Annotations for Human Nonsynonymous and Splice-Site SNVs. Hum Mutat 37, 235-241 (2016).

Y. B. Simons, M. C. Turchin, J. K. Pritchard, G. Sella, The deleterious mutation load is insensitive to recent population history. Nature genetics 46, 220-224 (2014).

Y. Benjamini, Y. Hochberg, Controlling the False Discovery Rate: A Practical and Powerful Approach to Multiple Testing. J. R. Stat. Soc. B57, 289-300 (1995).

Y. Choi, G. E. Sims, S. Murphy, J. R. Miller, A. P. Chan, Predicting the functional effect of amino acid substitutions and indels. PLoS One 7, e46688 (2012).

Y. E. Kim, C. S. Ki, M. A. Jang, Challenges and Considerations in Sequence Variant Interpretation for Mendelian Disorders. Ann Lab Med 39, 421-429 (2019).

Y. Yang et al., Molecular findings among patients referred for clinical whole-exome sequencing. Jama 312, 1870-1879 (2014).

Y. You et al., Pseudo-Lidar++: Accurate Depth for 3D Object Detection in Autonomous Driving; in International Conference on Learning Representations. (2020).

Y. You et al., Large Batch Optimization for Deep Learning: Training BERT in 76 Minutes; in International Conference on Learning Representations. (2020).

Y. Zhang, J. Skolnick, Scoring function for automated assessment of protein structure template quality. Proteins57, 702-710 (2004).

Z. Fan et al., Ancient hybridization and admixture in macaques (genus *Macaca*) inferred from whole genome sequences. Mol Phylogenet Evol 127, 376-386 (2018).

Z. Liu et al., Genomic Mechanisms of Physiological and Morphological Adaptations of Limestone Langurs to Karst Habitats. Mol Biol Evol 37, 952-968 (2020).

\* cited by examiner

Figure 3

Genetic Variants 300

Genetic Sequence A 302

| 1 | 2 | 3 | 4 | 5 | 6 | 7 | 8 | ... | N$^{th}$ |
|---|---|---|---|---|---|---|---|-----|----------|
| A | ... | ... | ... | C | ... | ... | ... | ... | G |

306 — Single Nucleotide Variant

Variant 1A 322

| 1 | 2 | 3 | 4 | 5 | 6 | 7 | 8 | ... | N$^{th}$ |
|---|---|---|---|---|---|---|---|-----|----------|
| A | ... | ... | ... | A | ... | ... | ... | ... | G |

326 — Single Nucleotide Variant

Variant 1B 342

| 1 | 2 | 3 | 4 | 5 | 6 | 7 | 8 | ... | N$^{th}$ |
|---|---|---|---|---|---|---|---|-----|----------|
| A | ... | ... | ... | T | ... | ... | ... | ... | G |

336

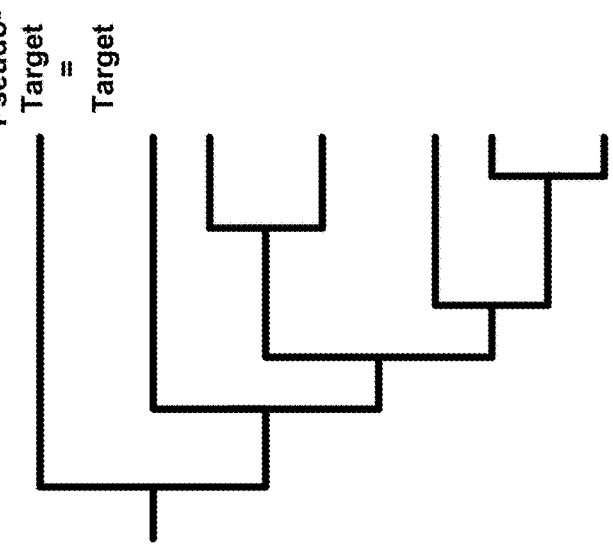
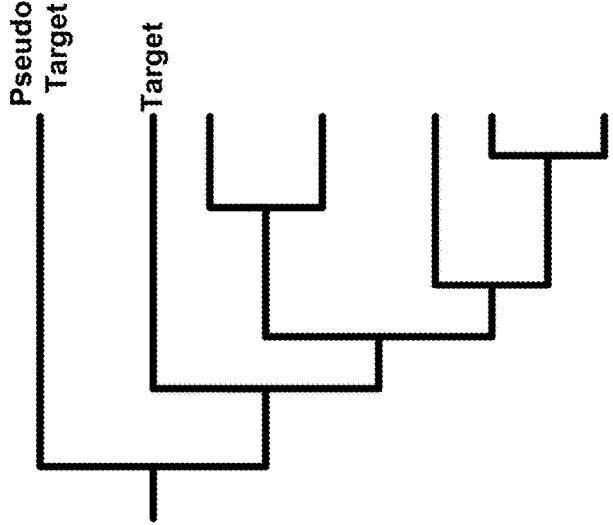
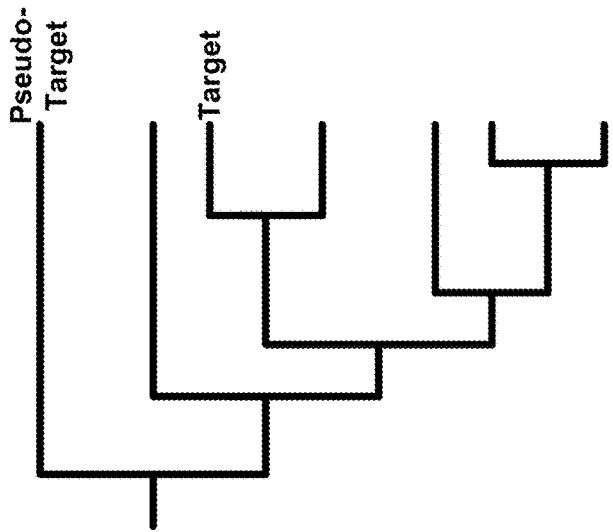
Figure 7

Variant Features Describing Guanine-Cytosine Content 1100

Genetic Sequence B 1102

| A | T | A | A | G | A | C | G | T | T | G | A | C | A | C |

GC Content of Genetic Sequence B

$$\frac{(G+C)}{(A+C+G+T)} = \frac{(3+3)}{(6+3+3+3)} = 0.4$$

1122

GC Skew of Genetic Sequence B

$$\frac{(G-C)}{(G+C)}$$

1124

Window 1: A T A A G A C G T T G A C A C
Window 2: A T A A G A C G T T G A C A C
Window 3: A T A A G A C G T T G A C A C Window Size = 5
1164

Table 1184

| Window | 1 | 2 | 3 | 4 | 5 | 6 | 7 | 8 | 9 | 10 | 11 |
|---|---|---|---|---|---|---|---|---|---|---|---|
| $\frac{(G-C)}{(G+C)}$ | 1/1 | 1/1 | 0/2 | 1/3 | 1/3 | 0/2 | 1/3 | 2/2 | 0/2 | 0/2 | -1/3 |
| Derivation from [G] = [C] | 1 | 1 | 0 | 0.33 | 0.33 | 0 | 0.33 | 1 | 0 | 0 | -0.33 |

Figure 11

Variant Features Describing Local Composition Complexity 1200

Genetic Sequence B 1204

| A | T | A | A | G | A | C | G | T | T | G | A | C | A | C |

Local Composition Complexity of Genetic Sequence B

1224

Entropy = $-\sum_i -(p_i \log_2 p_i)$ $p_A = 6/16$ ∴ $-((p_A)(\log_2 p_A)) = (6/16)(\log_2(16)-\log_2(6)) = 0.628$ $p_T = 3/16$ ∴ $-((p_T)(\log_2 p_T)) = (3/16)(\log_2(16)-\log_2(3)) = 0.464$ $p_C = 3/16$ ∴ $-((p_C)(\log_2 p_C)) = (3/16)(\log_2(16)-\log_2(3)) = 0.464$ $p_G = 3/16$ ∴ $-((p_G)(\log_2 p_G)) = (3/16)(\log_2(16)-\log_2(3)) = 0.464$ Entropy = 0.628 + 0.464 + 0.464 + 0.464

Entropy = 1.92

Genetic Sequence X 1202

| A | A | A |

→ Low Entropy

Genetic Sequence Y 1222

| A | A | C |

→ Medium Entropy

Genetic Sequence Z 1242

| A | T | C | G |

→ High Entropy

Figure 12

Variant Features Describing Allelic Count 1300

Variant 1 1302

| A | A | C |
|---|---|---|

Variant 2 1304

| A | A | T | C |
|---|---|---|---|

Population 1322

Allelic Count of Variant 1 = 6
Allelic Count of Variant 2 = 9

Figure 13

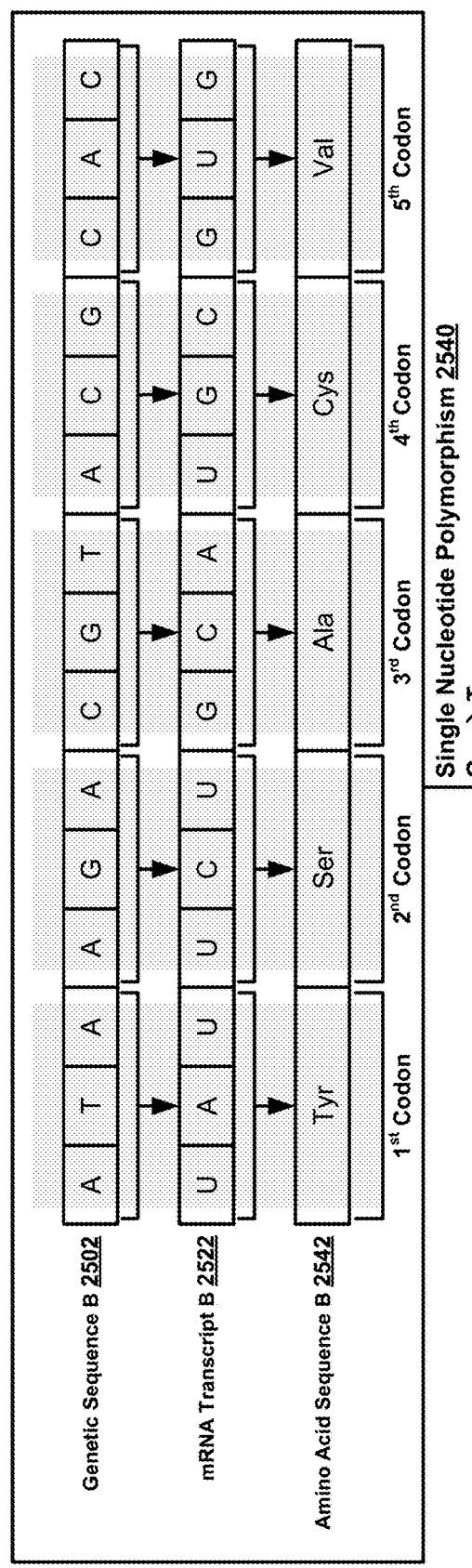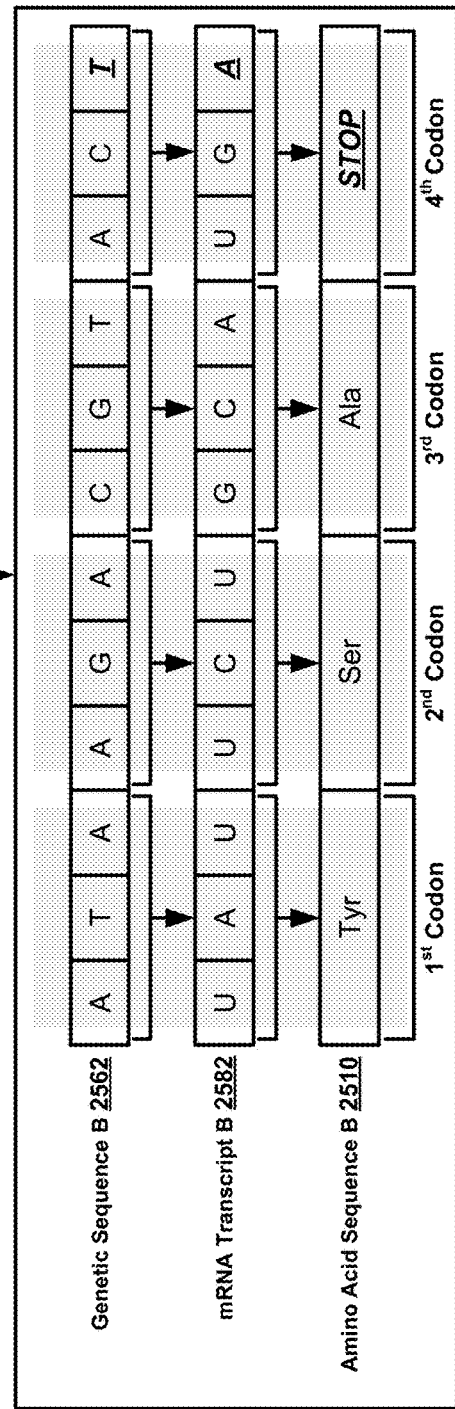
Figure 25

QUALITY DETECTION OF VARIANT CALLING USING A MACHINE LEARNING CLASSIFIER

PRIORITY APPLICATIONS

This application claims the benefit of and priority to the following:

U.S. Provisional Patent Application No. 63/294,813, titled "PERIODIC MASK PATTERN FOR REVELATION LANGUAGE MODELS," filed Dec. 29, 2021;

U.S. Provisional Patent Application No. 63/294,816, titled "CLASSIFYING MILLIONS OF VARIANTS OF UNCERTAIN SIGNIFICANCE USING PRIMATE SEQUENCING AND DEEP LEARNING," filed Dec. 29, 2021;

U.S. Provisional Patent Application No. 63/294,820, titled "IDENTIFYING GENES WITH DIFFERENTIAL SELECTIVE CONSTRAINT BETWEEN HUMANS AND NON-HUMAN PRIMATES," filed Dec. 29, 2021;

U.S. Provisional Patent Application No. 63/294,827, titled "DEEP LEARNING NETWORK FOR EVOLUTIONARY CONSERVATION," filed Dec. 29, 2021;

U.S. Provisional Patent Application No. 63/294,828, titled "INTER-MODEL PREDICTION SCORE RECALIBRATION," filed Dec. 29, 2021; and U.S. Provisional Patent Application No. 63/294,830, titled "SPECIES-DIFFERENTIABLE EVOLUTIONARY PROFILES," filed Dec. 29, 2021.

The priority applications are incorporated by reference as if fully set forth herein.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep convolutional neural networks to analyze ordered data.

RELATED APPLICATIONS

This application is related to US Nonprovisional patent application titled "VARIANT CALLING WITHOUT A TARGET REFERENCE GENOME" (U.S. application Ser. No. 17/952,192), filed contemporaneously. The related application is hereby incorporated by reference for all purposes.

This application is related to US Nonprovisional patent application titled "UNIQUE MAPPER TOOL FOR EXCLUDING REGIONS WITHOUT ONE-TO-ONE MAPPING BETWEEN A SET OF TWO REFERENCE GENOMES" (U.S. application Ser. No. 17/952,198), filed contemporaneously. The related application is hereby incorporated by reference for all purposes.

INCORPORATIONS

The following are incorporated by reference for all purposes as if fully set forth herein, and should be considered part of, this provisional patent filing:

Sundaram, L. et al. Predicting the clinical impact of human mutation with deep neural networks. *Nat. Genet.* 50, 1161-1170 (2018);

Jaganathan, K. et al. Predicting splicing from primary sequence with deep learning. Cell 176, 535-548 (2019);

U.S. Patent Application No. 62/573,144, titled "TRAINING A DEEP PATHOGENICITY CLASSIFIER USING LARGE-SCALE BENIGN TRAINING DATA," filed Oct. 16, 2017;

U.S. Patent Application No. 62/573,149, titled "PATHOGENICITY CLASSIFIER BASED ON DEEP CONVOLUTIONAL NEURAL NETWORKS (CNNs)," filed Oct. 16, 2017;

U.S. Patent Application No. 62/573,153, titled "DEEP SEMI-SUPERVISED LEARNING THAT GENERATES LARGE-SCALE PATHOGENIC TRAINING DATA," filed Oct. 16, 2017;

U.S. Patent Application No. 62/582,898, titled "PATHOGENICITY CLASSIFICATION OF GENOMIC DATA USING DEEP CONVOLUTIONAL NEURAL NETWORKS (CNNs)," filed Nov. 7, 2017;

U.S. patent application Ser. No. 16/160,903, titled "DEEP LEARNING-BASED TECHNIQUES FOR TRAINING DEEP CONVOLUTIONAL NEURAL NETWORKS," filed on Oct. 15, 2018;

U.S. patent application Ser. No. 16/160,986, titled "DEEP CONVOLUTIONAL NEURAL NETWORKS FOR VARIANT CLASSIFICATION," filed on Oct. 15, 2018;

U.S. patent application Ser. No. 16/160,968, titled "SEMI-SUPERVISED LEARNING FOR TRAINING AN ENSEMBLE OF DEEP CONVOLUTIONAL NEURAL NETWORKS," filed on Oct. 15, 2018;

U.S. patent application Ser. No. 16/160,978, titled "DEEP LEARNING-BASED SPLICE SITE CLASSIFICATION," filed on Oct. 15, 2018;

U.S. patent application Ser. No. 16/407,149, titled "DEEP LEARNING-BASED TECHNIQUES FOR PRE-TRAINING DEEP CONVOLUTIONAL NEURAL NETWORKS," filed May 8, 2019;

U.S. patent application Ser. No. 17/232,056, titled "DEEP CONVOLUTIONAL NEURAL NETWORKS TO PREDICT VARIANT PATHOGENICITY USING THREE-DIMENSIONAL (3D) PROTEIN STRUCTURES," filed on Apr. 15, 2021;

U.S. Patent Application No. 63/175,495, titled "MULTI-CHANNEL PROTEIN VOXELIZATION TO PREDICT VARIANT PATHOGENICITY USING DEEP CONVOLUTIONAL NEURAL NETWORKS," filed on Apr. 15, 2021;

U.S. Patent Application No. 63/175,767, titled "EFFICIENT VOXELIZATION FOR DEEP LEARNING," filed on Apr. 16, 2021;

U.S. patent application Ser. No. 17/468,411, titled "ARTIFICIAL INTELLIGENCE-BASED ANALYSIS OF PROTEIN THREE-DIMENSIONAL (3D) STRUCTURES," filed on Sep. 7, 2021;

U.S. Provisional Patent Application No. 63/253,122, titled "PROTEIN STRUCTURE-BASED PROTEIN LANGUAGE MODELS," filed Oct. 6, 2021;

U.S. Provisional Patent Application No. 63/281,579, titled "PREDICTING VARIANT PATHOGENICITY FROM EVOLUTIONARY CONSERVATION USING THREE-DIMENSIONAL (3D) PROTEIN STRUCTURE VOXELS," filed Nov. 19, 2021;

U.S. Provisional Patent Application No. 63/281,592, titled "COMBINED AND TRANSFER LEARNING OF A VARI- ANT PATHOGENICITY PREDICTOR USING GAPED AND NON-GAPED PROTEIN SAMPLES," filed Nov. 19, 2021.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The explosion of available biological sequence data has led to multiple computational approaches that infer the proteins' three-dimensional structure, biological function, fitness, and evolutionary history from sequence data. So-called protein language models, like the ones based on the Transformer architecture, have been trained on large ensembles of protein sequences by using the masked language modeling objective of filling in masked amino acids in a sequence, given the surrounding ones.

Protein language models capture long-range dependencies, learn rich representations of protein sequences, and can be employed for multiple tasks. For example, protein language models can predict structural contacts from single sequences in an unsupervised way.

Protein sequences can be classified into families of homologous proteins that descend from an ancestral protein and share a similar structure and function. Analyzing multiple sequence alignments (MSAs) of homologous proteins provides important information about functional and structural constraints. The statistics of MSA columns, which represent amino-acid sites, identify functional residues that are conserved during evolution. Correlations of amino acid usage between the MSA columns contain important information about functional sectors and structural contacts.

Language models were initially developed for natural language processing and operate on a simple but powerful principle: they acquire linguistic understanding by learning to fill in missing words in a sentence, akin to a sentence completion task in standardized tests. Language models develop powerful reasoning capabilities by applying this principle across large text corpora. The Bidirectional Encoder Representations from Transformers (BERT) mode instantiated this principle using Transformers, a class of neural networks in which attention is the primary component of the learning system. In a Transformer, each token in the input sentence can "attend" to all other tokens by exchanging activation patterns corresponding to the intermediate outputs of neurons in a neural network.

Protein language models like the MSA Transformer have been trained to perform inference from MSAs of evolutionarily related sequences. The MSA Transformer interleaves per-sequence ("row") attention with per-site ("column") attention to incorporate coevolution. Combinations of row attention heads in the MSA Transformer have led to state-of-the-art unsupervised structural contact predictions.

End-to-end deep learning approaches for variant effect predictions are applied to predict the pathogenicity of missense variants from protein sequence and sequence conservation data (See Sundaram, L. et al. Predicting the clinical impact of human mutation with deep neural networks. *Nat. Genet.* 50, 1161-1170 (2018), referred to herein as "PrimateAI"). PrimateAI uses deep neural networks trained on variants of known pathogenicity with data augmentation using cross-species information. PrimateAI in particular uses sequences of wild-type and mutant proteins to compare the difference and decide the pathogenicity of mutations using the trained deep neural networks. Such an approach that utilizes the protein sequences for pathogenicity prediction is promising because it can avoid the problem of circularity and overfitting to previous knowledge. However, compared to the adequate number of data to train the deep neural networks effectively, the number of clinical data available in ClinVar is relatively small. To overcome this data scarcity, PrimateAI uses common human variants and variants from primates as benign data while simulated variants based on trinucleotide context were used as unlabeled data.

PrimateAI outperforms prior methods when trained directly upon sequence alignments. PrimateAI learns important protein domains, conserved amino acid positions, and sequence dependencies directly from the training data consisting of about 120,000 human samples. PrimateAI substantially exceeds the performance of other variant pathogenicity prediction tools in differentiating benign and pathogenic de-novo mutations in candidate developmental disorder genes, and in reproducing prior knowledge in ClinVar. These results suggest that PrimateAI is an important step forward for variant classification tools that may lessen the reliance of clinical reporting on prior knowledge.

Therefore, an opportunity arises to use protein language models and MSAs for variant pathogenicity prediction. More accurate variant pathogenicity prediction may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 3 illustrates an example of genetic variants from an example reference genetic sequence A with two example variant sequences in which the variant sequences possess a respective single nucleotide variant in a single base position but otherwise possess an identical composition to the reference sequence.

FIG. 7 is a schematic illustrating the evolutionary relationship between the target species and the pseudo-target species using simplified phylogenic tree graphics.

FIG. 11 is an illustrative example of the variant features in the plurality of variant features describing guanine-cytosine content.

FIG. 12 is an illustrative example of the variant feature in the plurality of variant features describing local composition complexity.

FIG. 13 is an illustrative example of the variant feature in the plurality of variant features describing allelic count.

FIG. 25 is an illustration of a nonsense variant.

DETAILED DESCRIPTION

Figure 1:
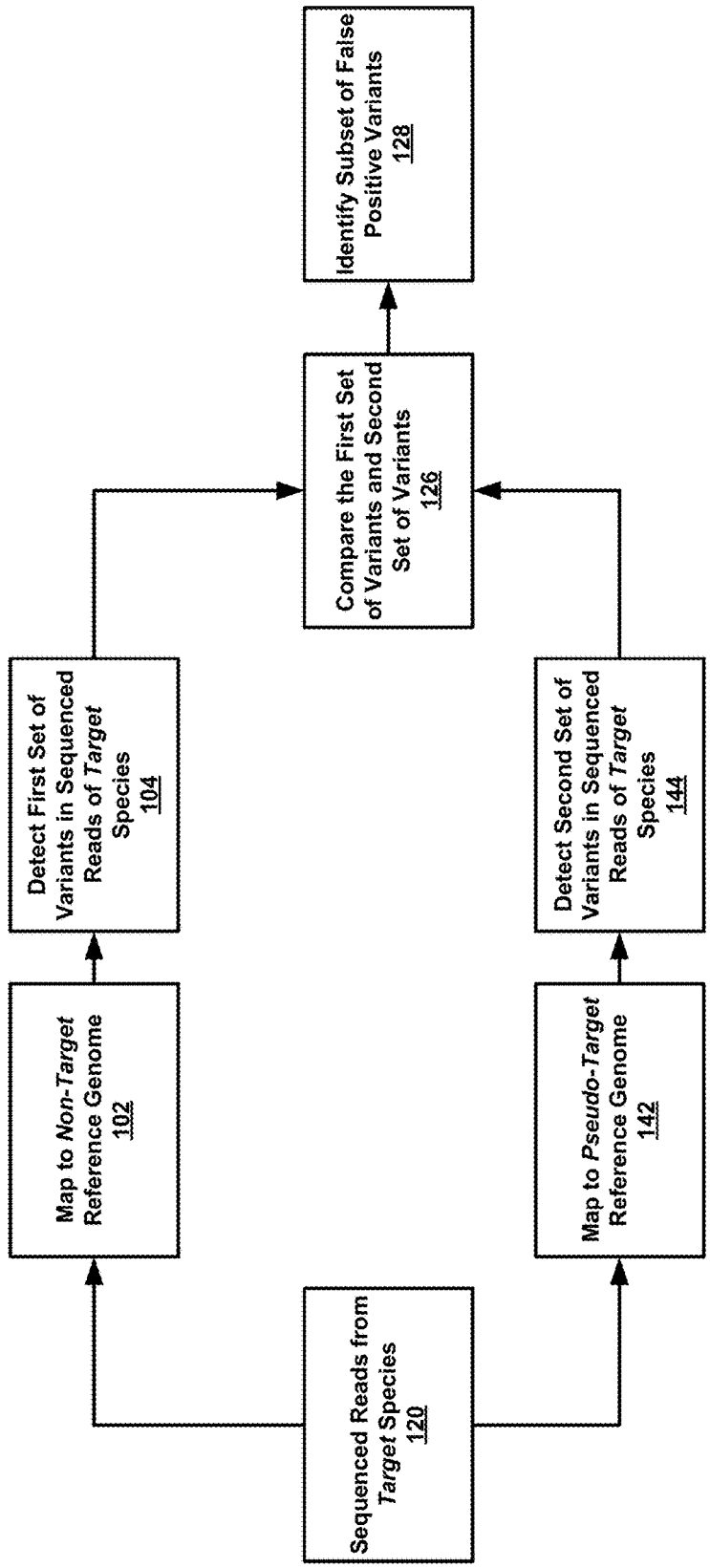
FIG. 1 is a flow diagram that illustrates a process of a system for variant calling for a particular Target Species 120 without using the target reference genome.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

The technologies disclosed can be used to improve the quality of pathogenic variant calling. The technology disclosed can be used to improve the quality of variant calling in scenarios where desired reference genomes are unavailable. There are 8.7 million species worldwide, but very few have reference genome builds. In many scenarios, we need to do variant calling in the absence of reference genome builds. In some instances, we could choose a closely-related species as a reference genome for variant calling. But this, sometimes, leads to many false positive calls. Thus, we developed various methods to reduce the false positives, including the random forest classifiers, linear regression models, and neural network models. We also devised a unique-mapper score to identify regions that are not one-to-one mapping between the species, which will further reduce variant calling errors.

Variant Calling Using a Non-Target Reference Genome

FIG. 1 is a flow diagram that illustrates a process 100 of a system for variant calling for a particular Target Species 120 without using the target reference genome. Mapping sequenced reads from a Target Species 120 to a Non-Target Reference Genome 102 detects a First Set of Variants in the Sequenced Reads of the Target Species 104. The Non-Target Reference Genome 102 is from a non-target species other than the Target Species 120. In some implementations of the technology disclosed, the Non-Target Reference Genome 102 is non-homologous with the genome of Target Species 120, as determined by a homology threshold (such as a percentage homology below 30%, 40%, or 50%, or a double-bounded range of acceptable homology percentages such as 30-40% or 40-50%). In certain embodiments, the non-target species and Target Species 120 belong to the same taxonomical genus, family, order, or class.

Mapping sequenced reads from a Target Species 120 to a Pseudo-Target Reference Genome 142 detects a Second Set of Variants in the Sequenced Reads of the Target Species 144. The Pseudo-Target Reference Genome 142 is from a pseudo-target species other than the Target Species 120. In some implementations of the technology disclosed, the Pseudo-Target Reference Genome 142 is homologous with the genome of Target Species 120, as determined by a homology threshold (such as a percentage homology above 80%, 90%, or 95%, or a double-bounded range of acceptable homology percentages such as 85-90% or 80-89%). A homology threshold set to determine degree of homology between the pseudo-target species and target species may be the same as a homology threshold set to determine degree of homology between the non-target species and target species, or the respective homology thresholds may differ. In some embodiments, the homology threshold set to determine degree of homology between the non-target species and target species may be informed by the degree of homology between the pseudo-target species and target species, or vice versa. The Comparison 126 of the first set of variants and second set of variants identifies a subset of False Positive Variants 128 (i.e., overlapping variants identified by mapping to the Pseudo-Target Reference Genome 142 cannot be considered as reliable positive variants on the basis of homology when the variants are also identified by mapping to Non-Target Reference Genome 102).

Figure 2:
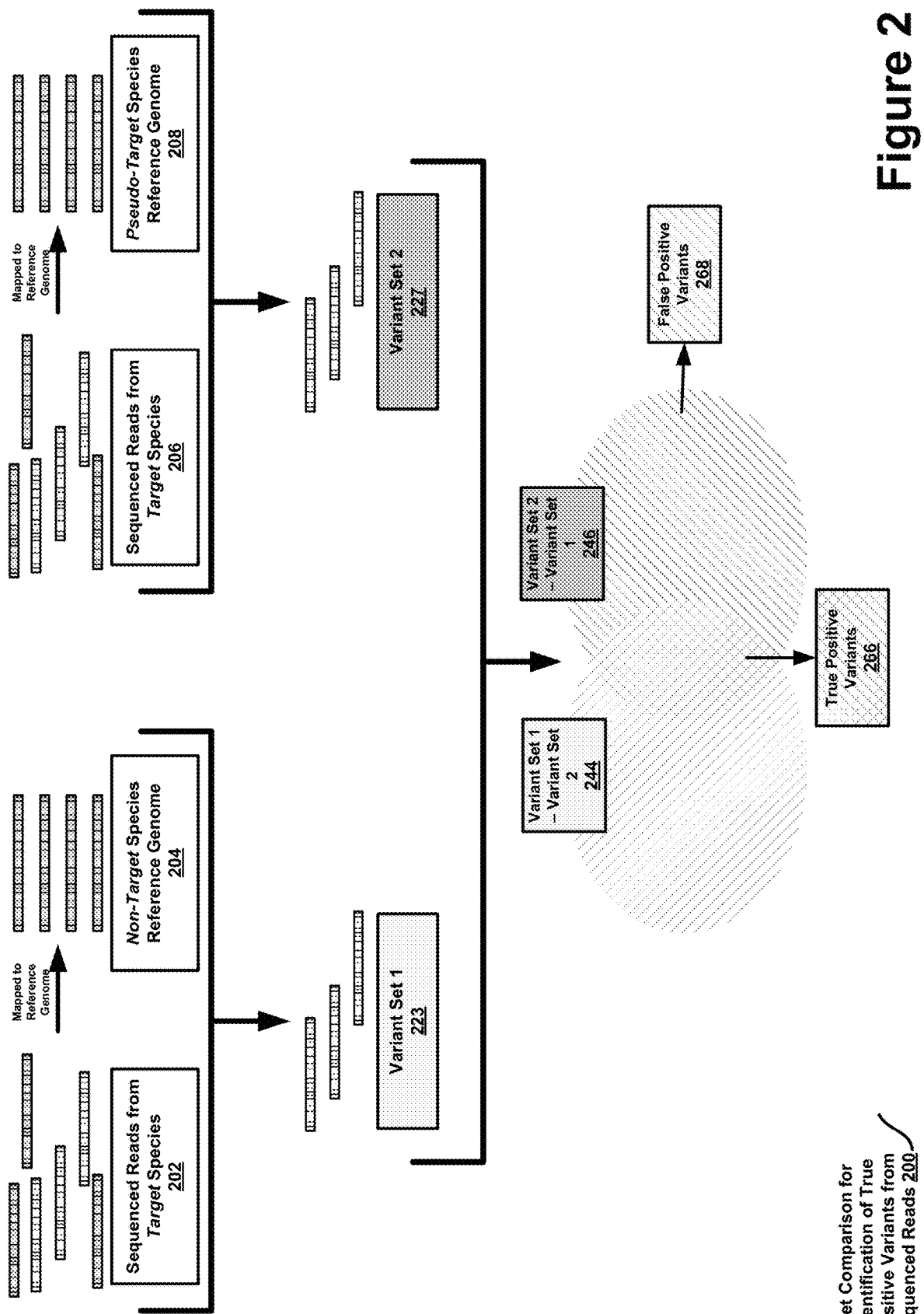
FIG. 2 is a sequential flow diagram representing the process of identifying false positive variants by means of a set comparison for identification of true positive variants from sequenced reads.

FIG. 2 is a sequential flow diagram 200 representing the process of identifying false positive variants by means of a set comparison for identification of true positive variants from sequenced reads. Mapping sequenced reads from a Target Species 202 to a Non-Target Species Reference Genome 204 detects a First Set of Variants 223. Mapping sequenced reads from a Target Species 206 to a Pseudo-Target Species Reference Genome 208 detects a Second Set of Variants 227. A Venn diagram represents the union Variant Set 1∪Variant Set 2, wherein the set difference Variant Set 1−Variant Set 2 is represented by the left downward diagonal shaded area 244 and the set difference Variant Set 2−Variant Set 1 is represented by the right upward diagonal shaded area 246. The intersection Variant Set 1∩Variant Set 2 is represented by the center diamond crosshatch shaded area 266. The intersection Variant Set 1∩Variant Set 2 (i.e., called variants identified both in the first set of variants 223 detected by mapping to a Non-Target Reference Genome 204 and the Second Set of Variants 227 detected by mapping to a Pseudo-Target Reference Genome 208) translates to the set of True Positive Variants 266. The set difference Variant Set 2−Variant Set 1 (i.e., called variants identified in the Second Set of Variants 227 detected by mapping to a Pseudo-Target Reference Genome 208 but not identified in the First Set of Variants 223 detected by mapping to a Non-Target Reference Genome 204) translates to the Set of False Positive Variants 268.

FIG. 3 illustrates an example of Genetic Variants 300 from an example Reference Genetic Sequence A 302 with two example Variant Sequences 1A 322 and 1B 342 in which the variant sequences possess a respective single nucleotide variant in a single base position but otherwise possess an identical composition to the reference sequence. For example, a single nucleotide substitution is shown as Adenine 326 in Variant 1A 322 and Thymine 336 in Variant 1B 342 as compared to Cytosine 306 in the Reference Genetic Sequence A 302.

Figure 4:
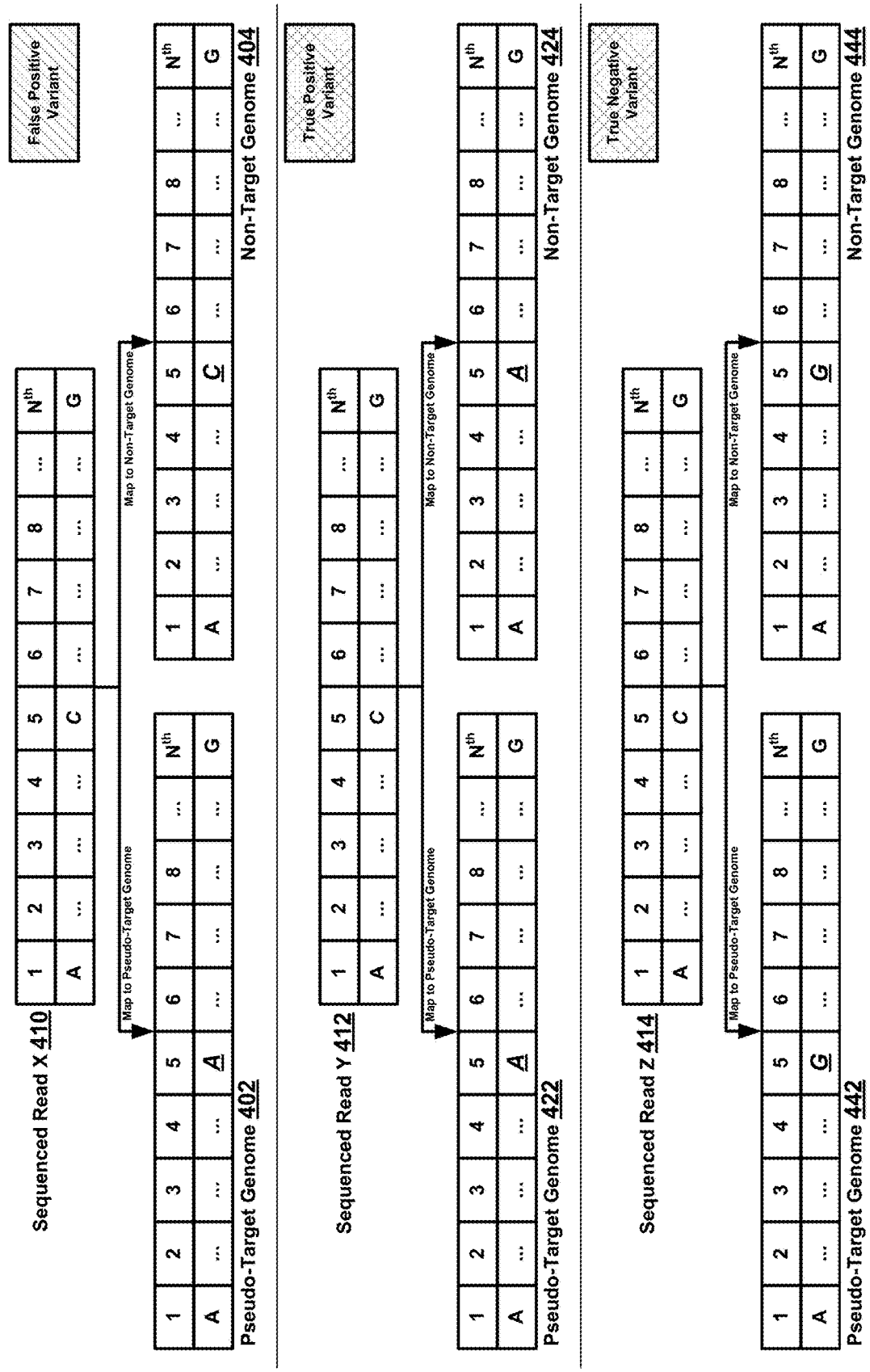
FIG. 4 graphically represents the process of base-resolution variant calling sensitivity detection in a series of example flow diagrams mapping sequenced reads to reference genomes.

FIG. 4 graphically represents the process 400 of base-resolution variant calling sensitivity detection in a series of example flow diagrams mapping sequenced reads to reference genomes. Sequenced Read X 410 is mapped to Pseudo-Target Reference Genome 402 and will be called as a variant due to the A→C single nucleotide variant in position 5. Sequenced Read X 410 is also mapped to Non-Target Reference Genome 404 and will not be called as a variant as a single nucleotide variant is not identified. As a result, Sequenced Read X 410 belongs to the set difference between the called variant set from mapping to the Pseudo-Target Reference Genome 402 and the variant set from mapping to the Non-Target Reference Genome 404 therefore Sequenced Read X 410 is a false positive. Sequenced Read Y 412 is mapped to Pseudo-Target Reference Genome 422 and will be called as a variant due to the A→C single nucleotide variant in position 5. Sequenced Read Y 412 is also mapped to Non-Target Reference Genome 424 and will be called as a variant due to the A→C single nucleotide variant in position 5. As a result, Sequenced Read Y 412 belongs to the set intersection between the called variant set from mapping to the Pseudo-Target Reference Genome 422 and the variant set from mapping to the Non-Target Reference Genome 424 therefore Sequenced Read Y 412 is a true positive.

Sequenced Read Z is mapped to Pseudo-Target Reference Genome 442 and will not be called as a variant despite the cytosine and guanine not being equivalent at position five. Due to base pairing, the complementary strand of the Pseudo-Target Reference Genome 442 possesses a cytosine at position 5 and the complementary strand of the Sequenced Read Z 414 possesses a guanine at position 5. As a result, this Sequenced Read Z 414 is not a variant when mapped to Pseudo-Target Reference Genome 442. Sequenced Read Z 414 is also mapped to Non-Target Reference Genome 444 and will not be called as a variant due to complementary bases being present at position 5. As a result, Sequenced Read Z 414 belongs to the complement of both the called variant set from mapping to the Pseudo-Target Reference Genome 442 and the called variant set from the Non-Target Reference Genome 444 therefore Sequenced Read Z 414 is a true negative variant.

Figure 5:
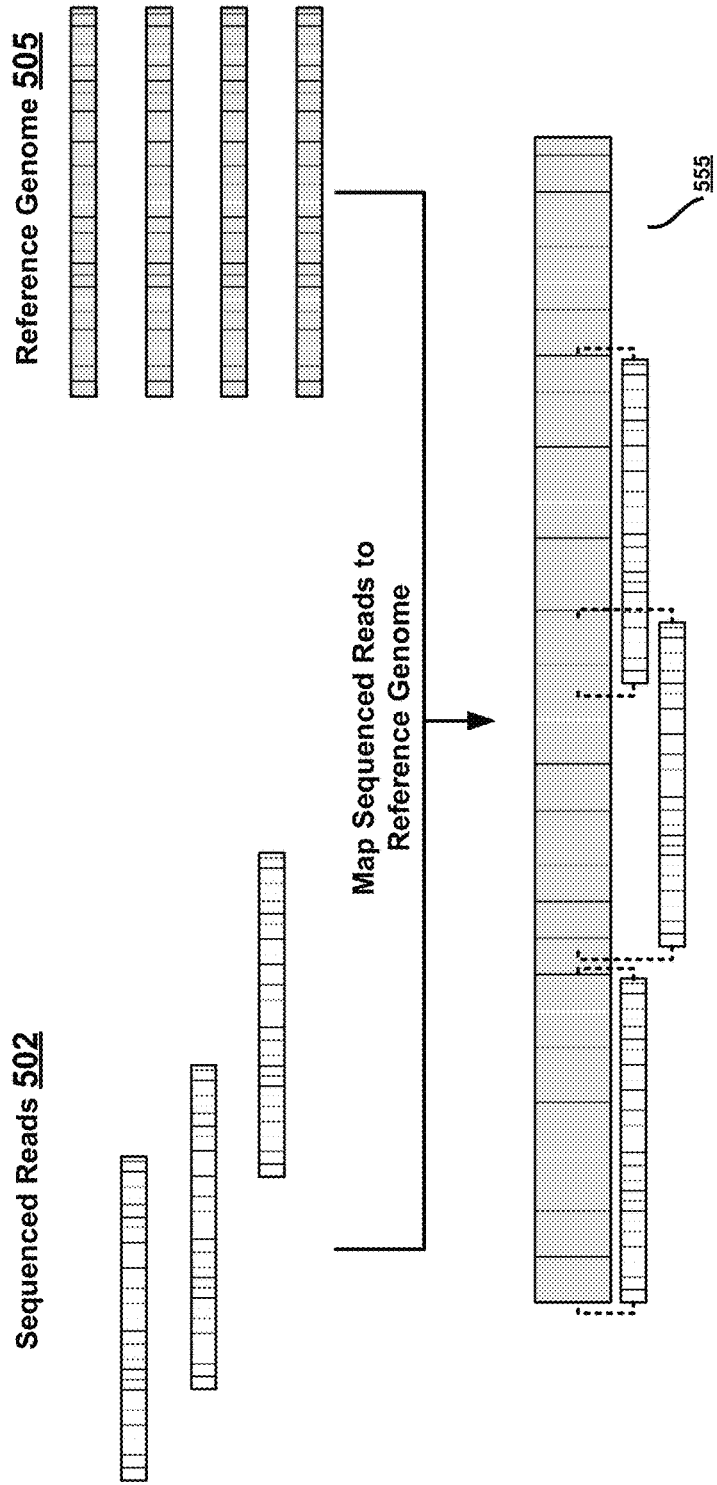
FIG. 5 is a schematic illustrating the process of mapping sequenced reads to a reference genome.

FIG. 5 is a schematic 500 illustrating the process of mapping sequenced reads to a Reference Genome. Sequenced Reads 502 are mapped to Reference Genome 505 resulting in Mapping 555. In Mapping 555, each sequenced read from the set of Sequenced Reads 502 aligns with a given genomic region within the Reference Genome 505. As seen in Mapping 555, mapped sequenced reads may align with genomic regions that are mutually exclusive (i.e., do not overlap, such as the leftmost sequenced read and the middle sequenced read in Mapping 555) or are not mutually exclusive from each other (i.e., do overlap, such as the middle sequenced read and the rightmost sequenced read in Mapping 555).

Figure 6:
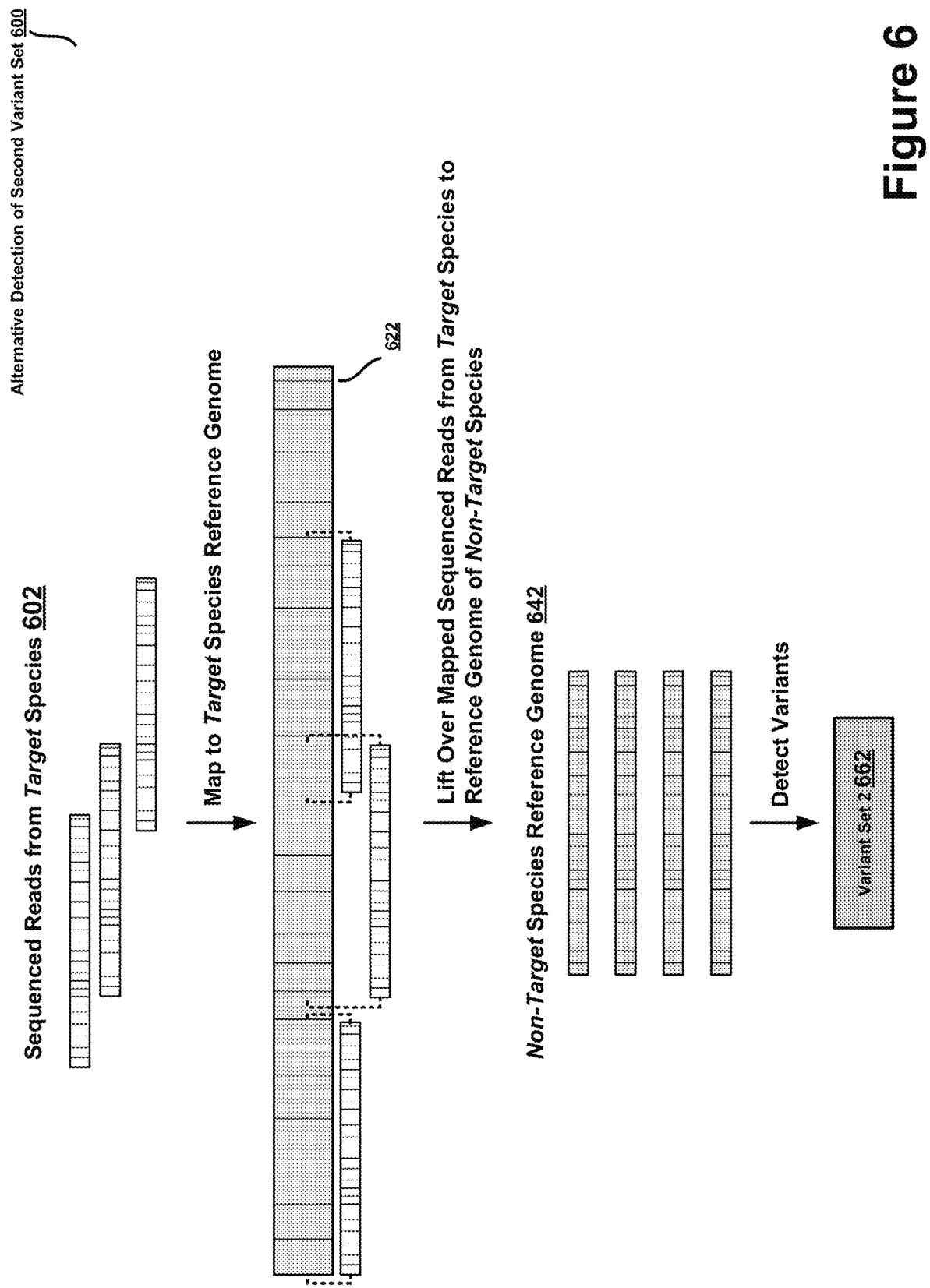
FIG. 6 represents a graphical flow diagram of a process for alternative detection of the second variant set in one implementation of the technology disclosed where a target species reference genome is available.

FIG. 6 represents a graphical flow diagram 600 of a process for alternative detection of Variant Set Two in one implementation of the technology disclosed where a Target Species Reference Genome 622 is available. Sequenced Reads from A Target Species 602 are mapped to the Target Species Reference Genome 622. The mapped sequence reads of the target species are lifted over to a Reference Genome Of A Non-Target Species 642. Variants that are detected in the Non-Target Species Reference Genome 642 but not detected in the Target Species Reference Genome 622 comprise Variant Set Two 662 wherein the plurality of variants in Variant Set Two 662 are false positive variants. The alternative detection of Variant Set Two 662 is useful in generating training data comprising known ground truth data to be used in training a machine learning classifier for the detection of true positive variants and false positive variants.

FIG. 7 is a schematic 700 illustrating the evolutionary relationship between the target species and the pseudo-target species using simplified phylogenic tree graphics. In Phylogenic Tree A 702, the pseudo-target species and the target species are different species that are not orthologous. In one implementation of the technology disclosed, the evolutionary relationship between the target species and the pseudo-target species is reflective of that shown in Phylogenic Tree A 702. In Phylogenic Tree B 704, the pseudo-target species and the target species are different species that are orthologous. In one implementation of the technology disclosed, the evolutionary relationship between the target species and the pseudo-target species is reflective of that shown in Phylogenic Tree B 704. In Phylogenic Tree C 706, the pseudo-target species and the target species are the same species. In one implementation of the technology disclosed, the evolutionary relationship between the target species and the pseudo-target species is reflective of that shown in Phylogenic Tree C 706.

Figure 8:
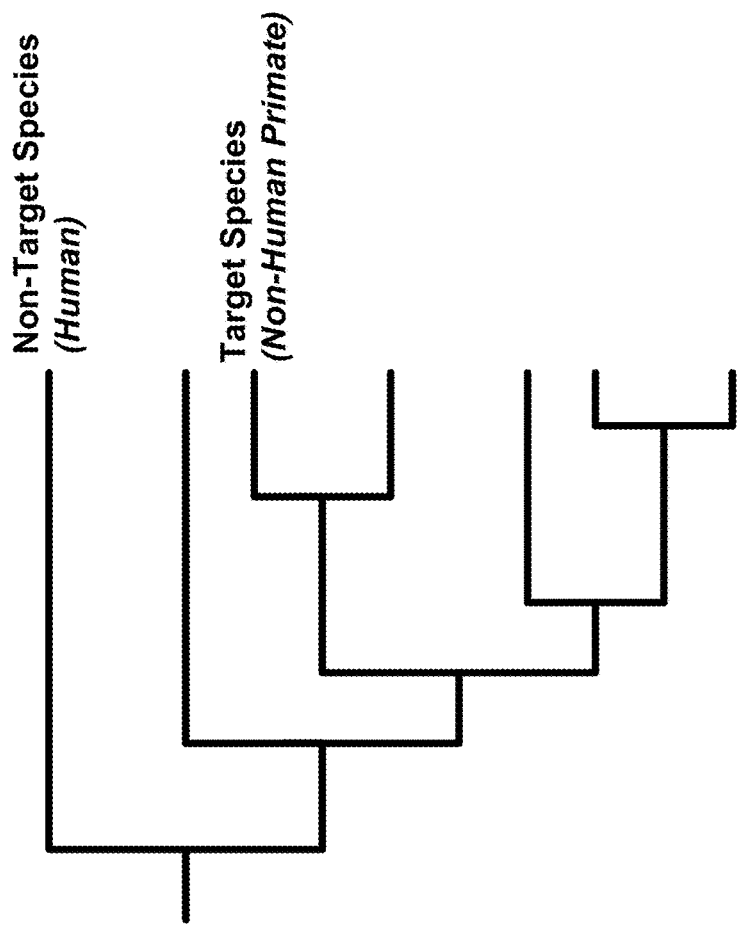
FIG. 8 is a schematic illustrating the evolutionary relationship between the target species and the pseudo-target species using a simplified phylogenic tree graphic.

FIG. 8 is a schematic 800 illustrating the evolutionary relationship between the target species and the pseudo-target species using a simplified phylogenic tree graphic. In Phylogenic Tree D 802, the non-target species and the target species are different species wherein the non-target species is a human and the target species is a non-human primate. In one implementation of the technology disclosed, the evolutionary relationship between the target species and the non-target species reflects that of Phylogenic Tree D 802. In one implementation of the technology disclosed, primate species samples and reference genomes are leveraged to infer the pathogenicity of orthologous human variants by variant calling to closely-related primate species genomes, variant calling to non-target, non-homologous primate species genomes, and contrasting the results as demonstrated within FIGS. 1-5. In some implementations of the technology disclosed, machine learning classifiers are trained to detect false positive variants, further refining the identification process of true positive variants.

Figure 9:
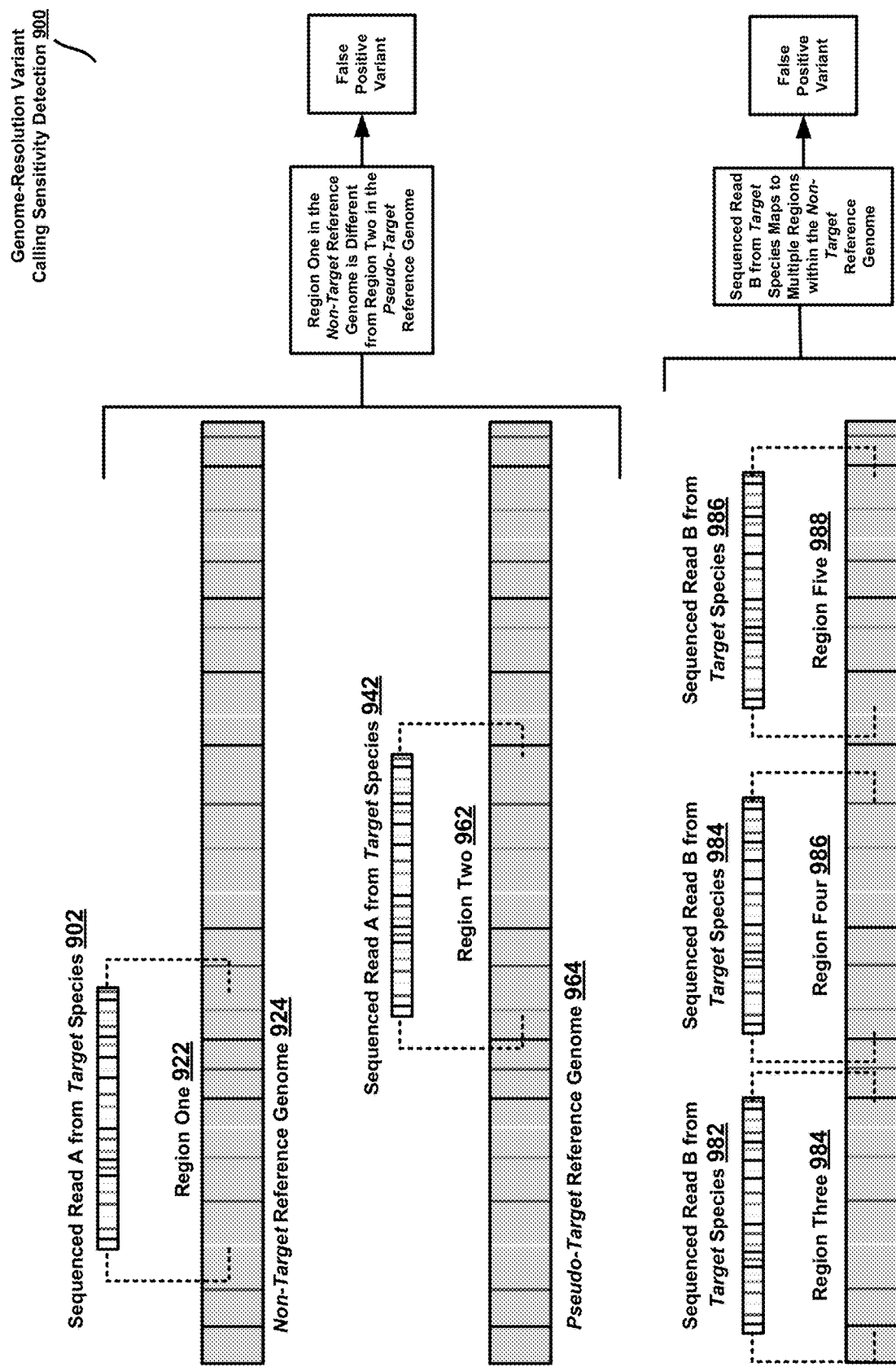
FIG. 9 is a schematic representing genome-resolution variant calling sensitivity detection of sequenced reads.

FIG. 9 is a schematic 900 representing genome-resolution variant calling sensitivity detection of sequenced reads. Sequenced Read A from a Target Species 902 is equivalent to Sequenced Read A from a Target Species 942 and maps to Region One 922 in the Non-Target Reference Genome 924 and Region Two 962 in the Pseudo-Target Reference Genome 964. Region One 922 and Region Two 962 are not equivalent (i.e., not orthologous), therefore Sequenced Read A does not map to the same genomic region in the Non-Target Reference Genome 924 and in the Pseudo-Target Reference Genome 964. Despite mapping to both the Non-Target Reference Genome 924 and the Pseudo-Target Reference Genome 964, Sequenced Read A 902 does not result in a called variant in the genomic region within the Non-Target Reference Genome 964 that is orthologous to the genomic region that Sequenced Read A 942 maps to within the Pseudo-Target Reference Genome 964. As a result, this variant will belong to the called variant set from mapping to the Pseudo-Target Reference Genome 964 but will not belong to the called variant set from mapping to the Non-Target Reference Genome 924 and results in a false positive.

Sequenced Read B from a Target Species 982, Sequenced Read B from a Target Species 984, and Sequenced Read B from a Target Species 986 are equivalent. Region Three 984, Region Four 986, and Region Five 988 belong to the non-target reference genome and are not equivalent. Sequenced Read B 982 from the Target Species maps to multiple regions within the non-target reference genome. As with Sequenced Read A 902, Sequenced Read B 982 will map to a different genomic region within the non-target species reference genome than the orthologous genomic region that Sequenced Read B 982 maps to within the pseudo-target reference genome due to the multiplicity of variant calling within the non-target reference genome. Subsequently, sequenced read that maps to more than two genomic regions within the non-target reference genome will result in a false positive.

Machine Learning Classifiers

Figure 10:
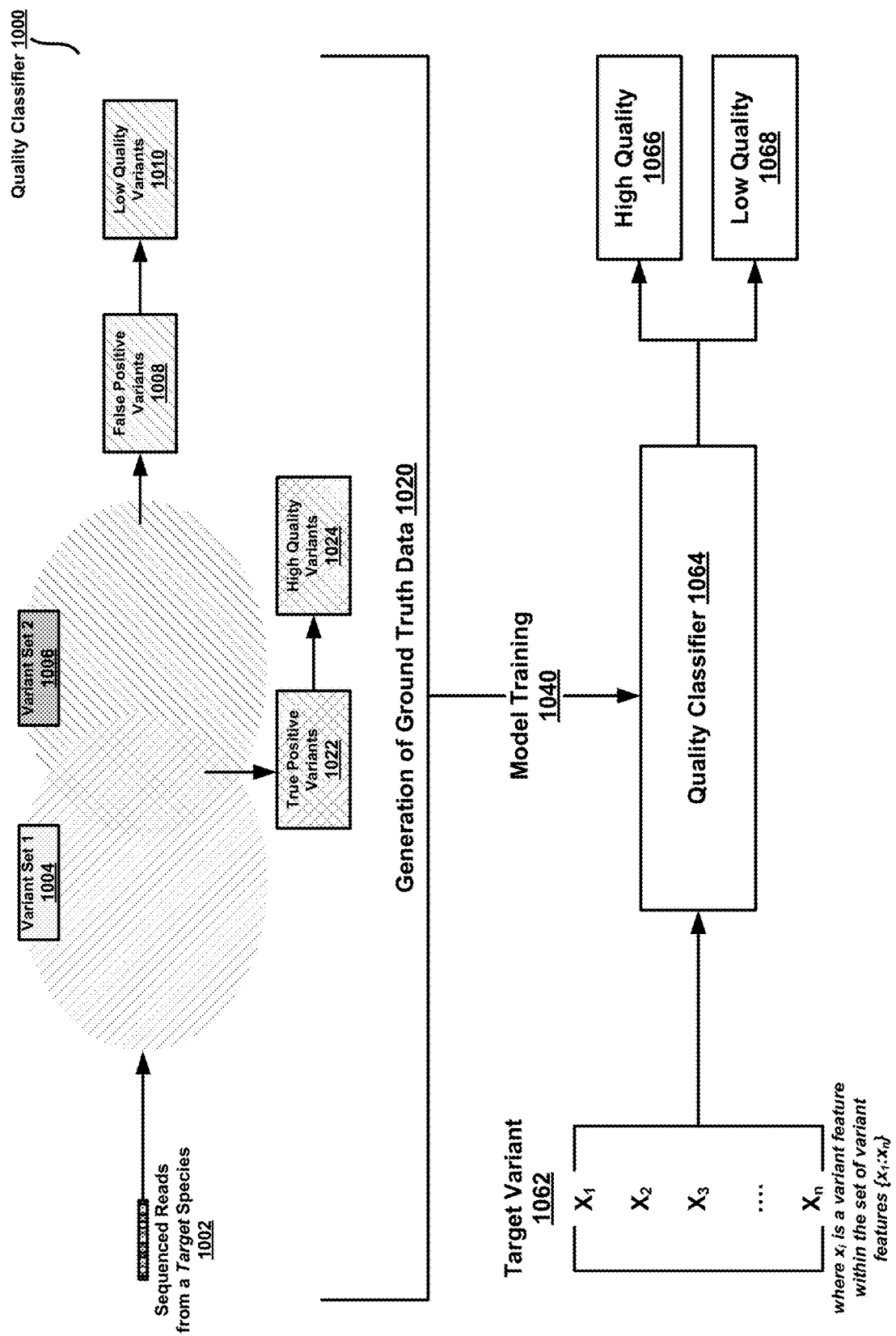
FIG. 10 is a schematic flow diagram demonstrating how the output data generated by the set comparison of sequenced reads mapped to a non-target reference genome and a pseudo-target reference genome can be used as a training dataset for a quality classifier to predict variant quality where a reference genome is not available, in contrast to methods wherein the quality is determined by mapping to non-target or pseudo-target genomes.

FIG. 10 is a schematic flow diagram 1000 demonstrating how the output data generated by the set comparison of sequenced reads mapped to a non-target reference genome and a pseudo-target reference genome can be used as a training dataset for a quality classifier to predict variant quality where a reference genome is not available, in contrast to methods wherein the quality is determined by mapping to non-target or pseudo-target genomes. Sequenced Reads from a Target Species 1002 are mapped to reference genomes as previously described in FIGS. 1, 2, and 3. The intersection of Variant Set One 1004 and Variant Set Two 1006 corresponds to the Set of True Positive Variants 1022. The set difference between Variant Set Two 1006 and Variant Set One 1004 (i.e., present in Variant Set Two 1006 but not present in Variant Set One 1004) corresponds to the Set of False Positive Variants 1008. The Set of True Positive Variants 1022 is further coded as a Set of High Quality Variants 1024. The Set of False Positive Variants 1008 is further coded as a Set of Low Quality Variants 1010. The combined set of High Quality Variants 1024 and Low Quality Variants 1010 comprise the set of Ground Truth Data 1020.

The Quality Classifier 1064 undergoes a Model Training Process 1040 on the Ground Truth Data 1020. The Quality Classifier 1064 takes an Input Target Variant 1062 represented as a vector containing the set of variant features in the plurality of variant features $\{x_1:x_n\}$ where each value of x is a variant feature within the set of variant features in the plurality of variant features describing the Target Variant 1062. In some implementations of the technology disclosed, additional variant features can be extracted from Variant Call Format (.vcf) files. The Quality Classifier 1064 is a binary classification model with output classes for High Quality 1066 and Low Quality 1068.

FIG. 11 is an illustrative example 1100 of the variant features in the plurality of variant features describing guanine-cytosine content. A short Genetic Sequence B 1102 contains a proportion of adenine, thymine, guanine, and cytosine nucleic acids. The guanine-cytosine content (GC)

of a genetic sequence corresponds to the proportion of guanine and cytosine nucleic acids within the sequence. GC content is a physiochemical descriptor of nucleic acid sequences that can be used as a proxy for thermostability of nucleic acid sequences due to differences in chemical bonding behavior as compared to adenine-thymine bonding behavior. GC content influences read coverage in next-generation sequencing applications. Equation 1122 is used for a sample calculation for the GC content of Genetic Sequence B 1102 wherein GC content is equivalent to the ratio of guanine and cytosine count to the overall count of all nucleic acids. Equation 1124 is used for a sample calculation of genetic skew of Genetic Sequence B 1102 wherein GC skew is determined as the ratio of the difference between guanine count and cytosine count to the sum of guanine count and cytosine count for a given window size. The Window Size Example 1164 illustrates a window size of five. When the window size of five is applied to Genetic Sequence B 1102, GC skew is calculated as shown in Table 1184.

FIG. 12 is an illustrative example 1200 of the variant feature in the plurality of variant features describing local composition complexity. Local composition complexity is a measure of entropy in a genetic sequence. Genetic Sequence X 1202 contains no variability of nucleic acid composition and therefore has low entropy. Genetic Sequence Z 1242 has high variability of nucleic acid composition and therefore has high entropy. Genetic Sequence Y 1222 contains more variability than Genetic Sequence X 1202 but less than Genetic Sequence Z 1242 therefore it can be described as having a medium (i.e., moderate) level of entropy. Equation 1224 computes the entropy of a genetic sequence in the format of local composition complexity. A sample calculation for Genetic Sequence B 1204 results in an entropy value of 1.92 wherein entropy is equivalent to a sum of logarithmic probabilities scaled by the same respective probability for each nucleic acid.

FIG. 13 is an illustrative example 1300 of the variant feature in the plurality of variant features describing allelic count. Variant One 1302 is shown in shaded grey and Variant Two 1304 is shown in white. Population 1322 contains samples of numerous genetic sequences belonging to either Variant One 1302 or Variant Two 1304. Within Population 1322, there are six total samples belonging to Variant One 1302, thus the total allelic count of Variant One 1302 is six. Within Population 1322, there are nine total samples belonging to Variant Two 1304, thus the total allelic count of Variant One 1304 is nine. The error rate for detecting heterozygote called variants is higher than the comparable error rate of homozygous called variants (i.e., heterozygotic false positives occur at a higher rate than homozygotic false positives).

Figure 14:
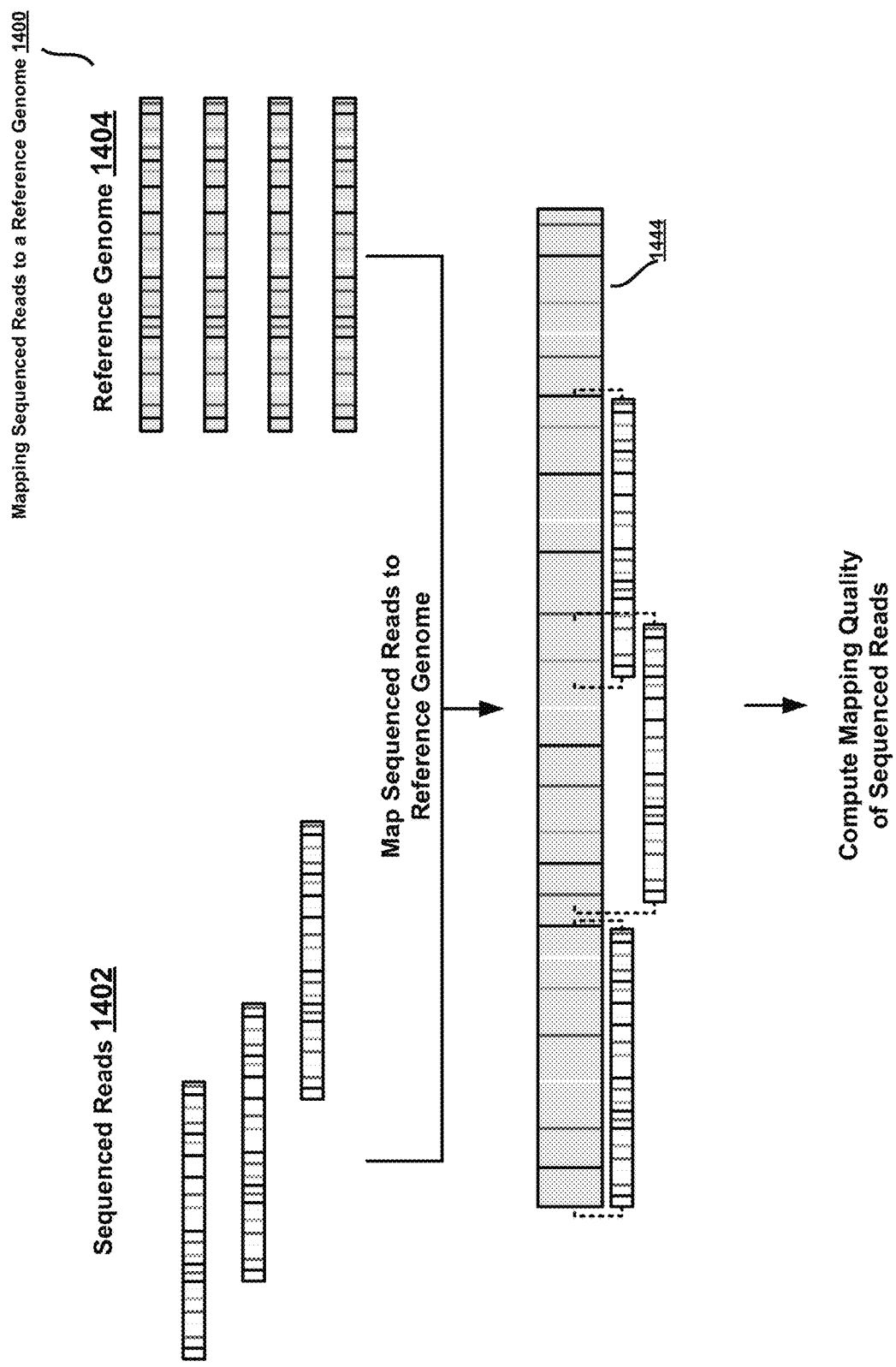
FIG. 14 is an illustrative example of the variant feature in the plurality of variant features describing process of mapping sequenced reads to a reference genome wherein an additional step is added to compute a quality metric of the mapping.

FIG. 14 is an illustrative example 1400 of the variant feature in the plurality of variant features describing process of mapping sequenced reads to a reference genome wherein an additional step is added to compute a quality metric of the mapping. Sequenced Reads 1402 are mapped to a Reference Genome 1404 to produce a Mapping 1444. Mapping quality scores quantify the likelihood of a misplaced sequenced read to the reference genome. Mapping quality is determined by total possible alignments for a given sequenced read and the count of mismatched base pairs within the alignment. The mapping quality score is reported on a Phred scale, a commonly used logarithmic data scaling technique for error rates in sequencing analysis.

Figure 15:
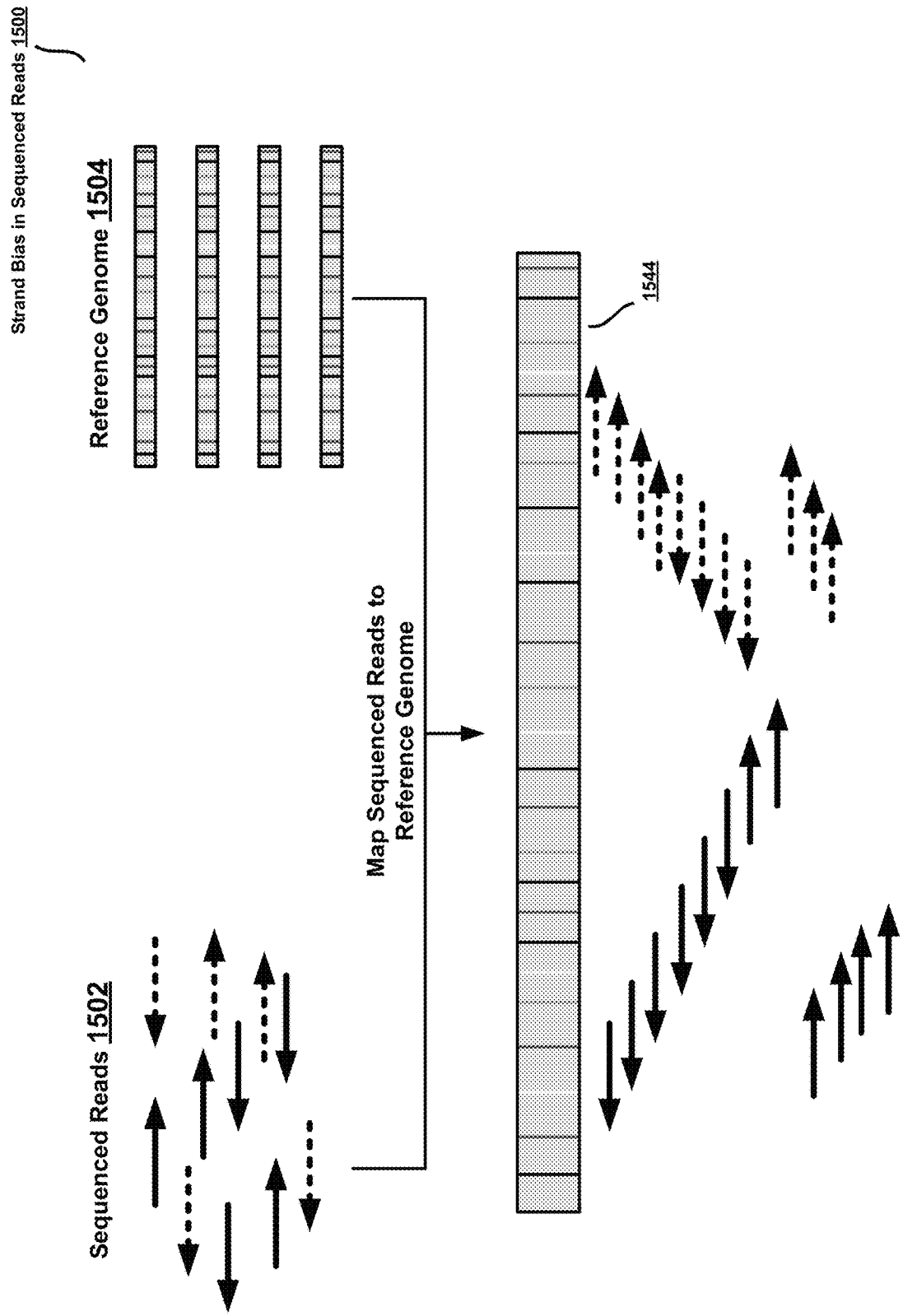
FIG. 15 is an illustrative example of the variant feature in the plurality of variant features describing strand bias in sequenced reads when mapped to a reference genome.

FIG. 15 is an illustrative example 1500 of the variant feature in the plurality of variant features describing strand bias in sequenced reads when mapped to a reference genome. Sequenced Reads 1502 contain reads with different strand orientation (i.e., strands oriented in the 5'→4' direction and strands oriented in the 3'→5' direction). As Sequenced Reads 1502 are mapped to Reference Genome 1504, the Mapping 1544 generated will display sequencing biases based on strand orientation wherein one DNA strand is favored over the other. Strand bias may result in a higher error rate for allele count.

Figure 16:
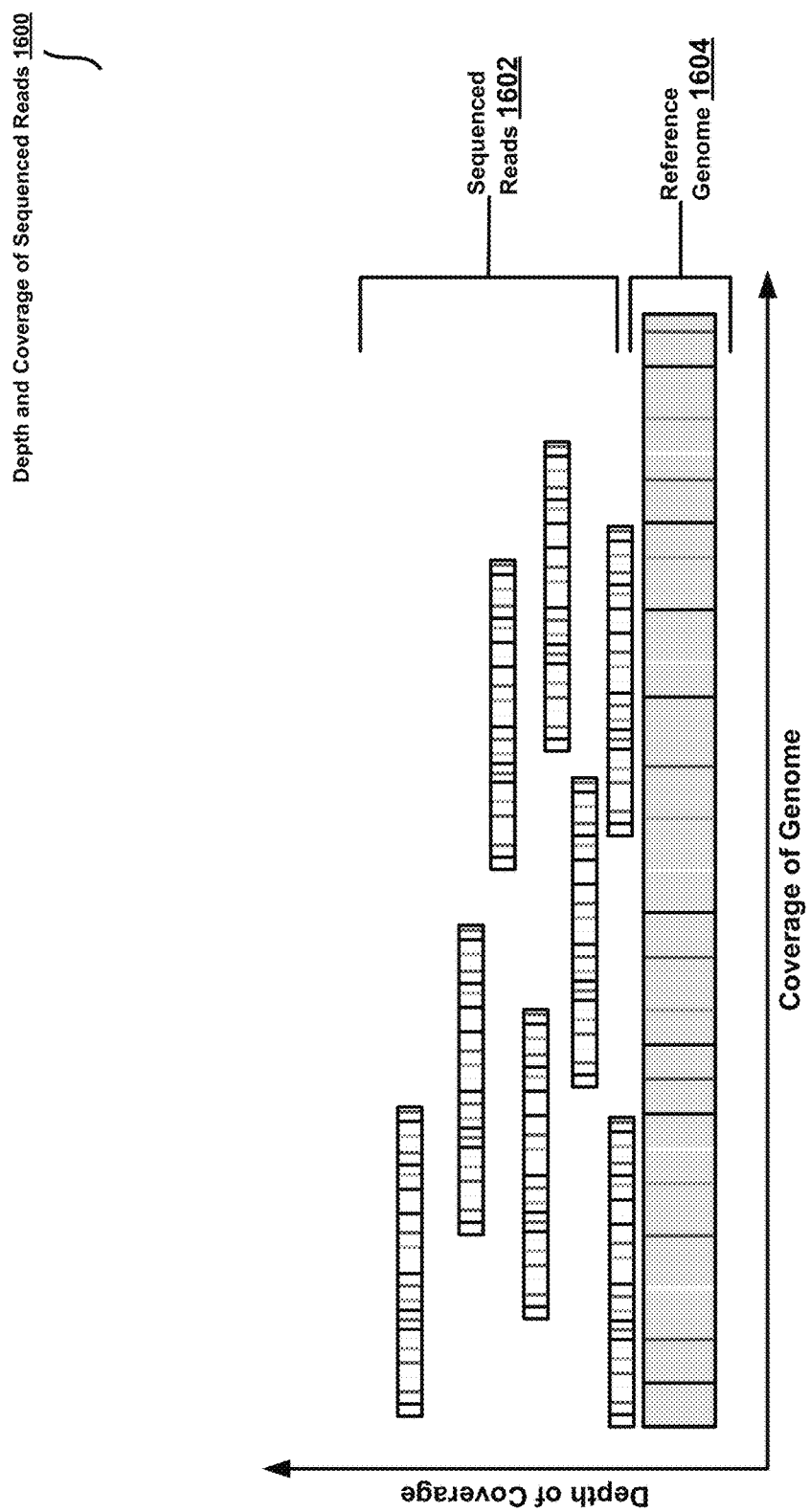
FIG. 16 is an illustrative example of the variant features in the plurality of variant features describing the depth and coverage of sequenced reads mapped to a reference genome.

FIG. 16 is an illustrative example 1600 of the variant features in the plurality of variant features describing the depth and coverage of sequenced reads mapped to a reference genome. Depth and coverage of a particular mapping are measures of mapping quality, where both sequencing coverage and depth of sequencing coverage are proportional metrics to the quality of the particular mapping. A set of sequenced reads 1602 are mapped to a reference genome 1604 at the various genomic regions along the X-axis. The total percentage of target bases within the reference genome to which sequenced reads are mapped is quantified as the coverage of the genome. The average depth of sequencing coverage is the ratio of the number of reads scaled by read length to the total referenced genome length. This concept is illustrated by visualizing the X-axis as length of the reference genome 1604 with coverage corresponding to the total spread breadth of the aligned sequenced reads 1602, whereas the Y-axis shows visualizes the depth by which the reference genome 1604 is covered.

Figure 17:
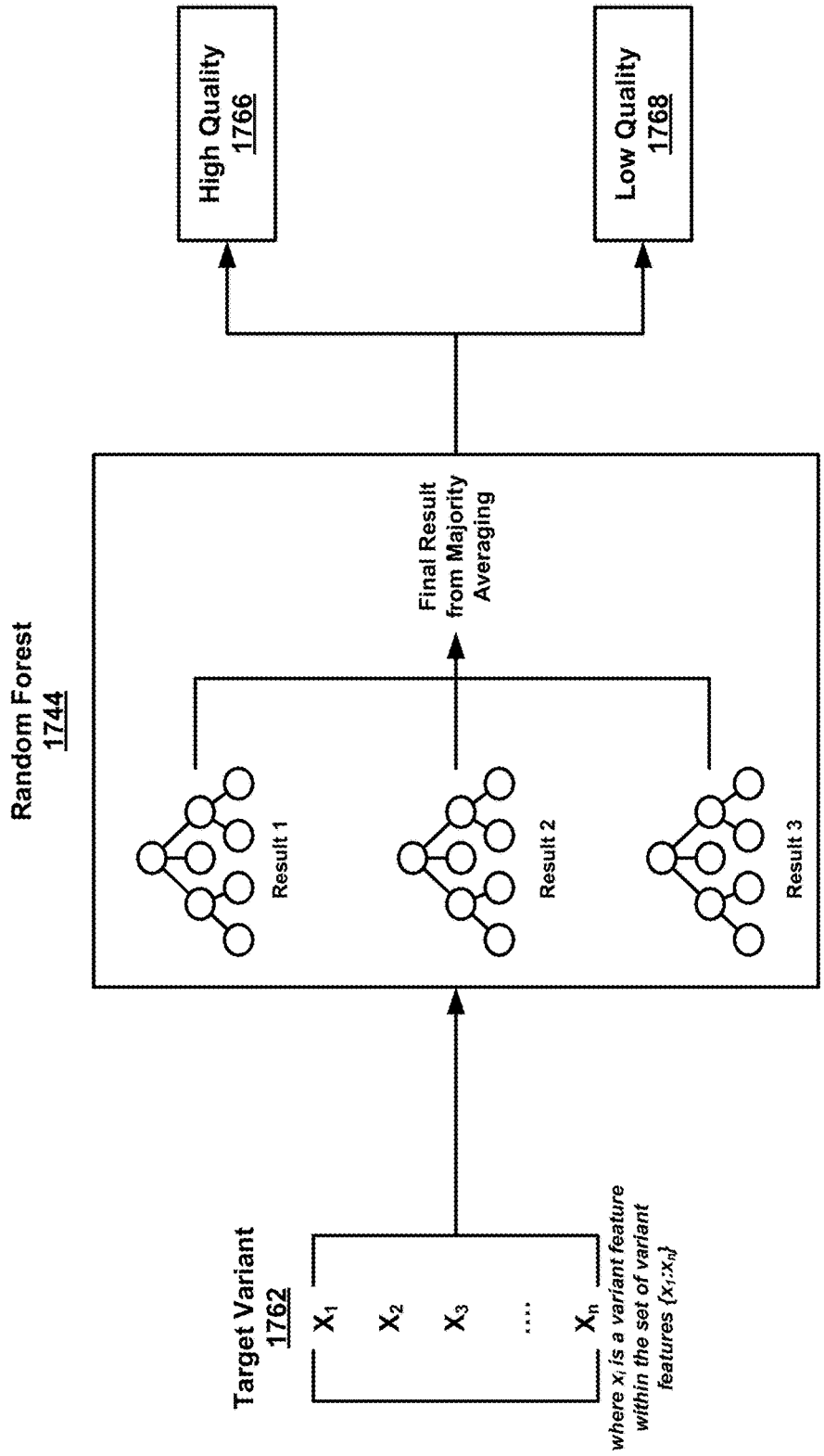
FIG. 17 is an illustrated flow diagram representing the variant quality classifier configured as a random forest model to classify a target variant as either belonging to the high quality class or the low quality class.

FIG. 17 is an illustrated flow diagram 1700 representing the variant quality classifier configured as a random forest model to classify a Target Variant 1762 as either belonging to the High Quality Class 1766 or the Low Quality Class 1768. The Quality Classifier 1744 takes an Input Target Variant 1762 represented as a vector containing the set of variant features in the plurality of variant features $\{x_1:x_n\}$ where each value of x is a variant feature within the set of variant features in the plurality of variant features describing the Target Variant 1762 and generates a classification from Random Forest Model 1744. In the Random Forest Model 1744, a plurality of decision trees each generate a respective output result of the target variant class and a final result is generated via majority averaging.

Figure 18:
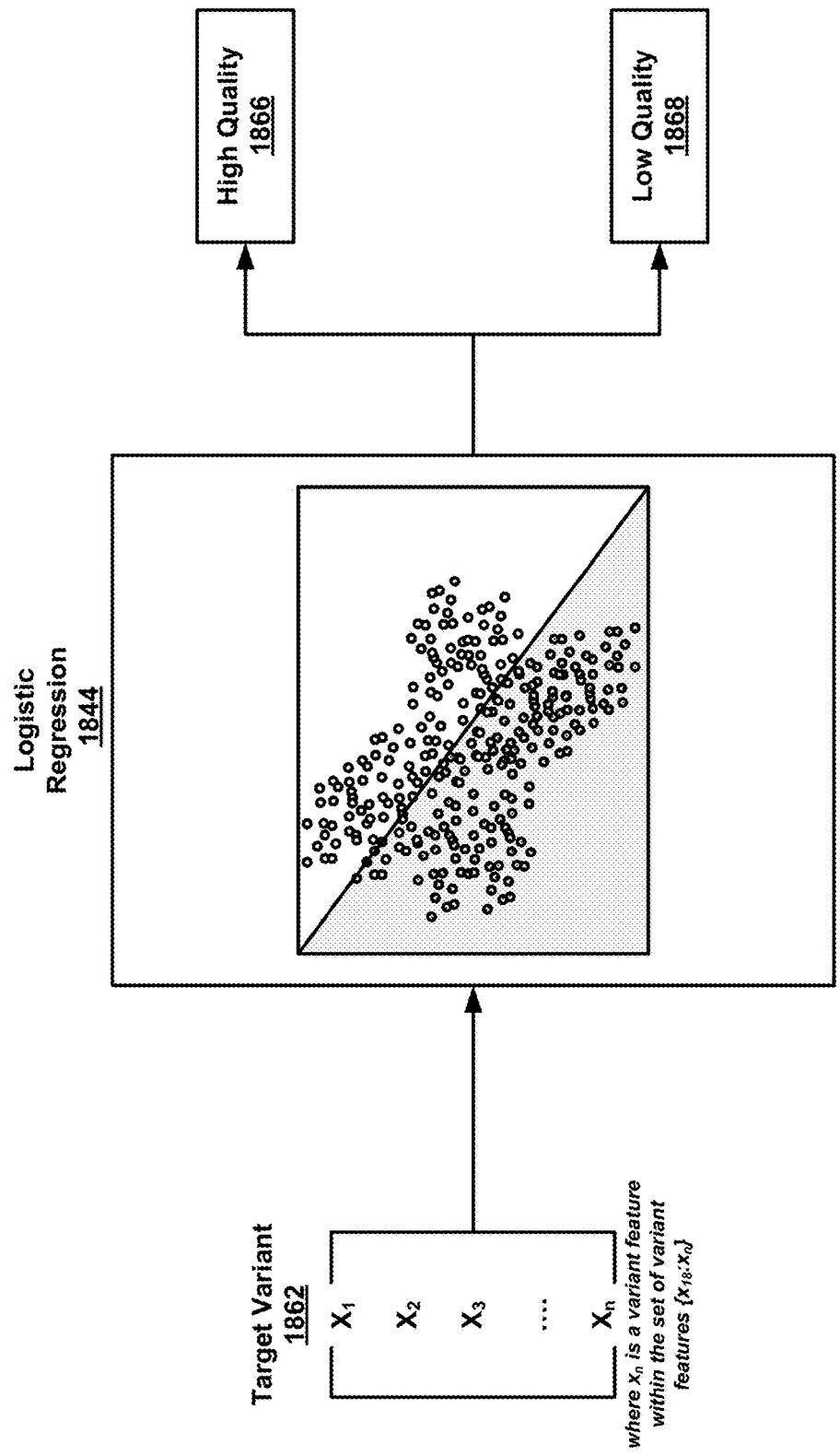
FIG. 18 is an illustrated flow diagram representing the variant quality classifier configured as a logistic regression model to classify a target variant as either belonging to the high quality class or the low quality class.

FIG. 18 is an illustrated flow diagram 1800 representing the variant quality classifier configured as a logistic regression model to classify a Target Variant 1862 as either belonging to the High Quality Class 1866 or the Low Quality Class 1868. The Quality Classifier 1844 takes an Input Target Variant 1862 represented as a vector containing the set of variant features in the plurality of variant features $\{x_1:x_n\}$ where each value of x is a variant feature within the set of variant features in the plurality of variant features describing the Target Variant 1862 and generates a classification from Logistic Regression Model 1844. In the Logistic Regression Model 1844, the model generates an output value in the range of $\{0,1\}$ and a decision threshold boundary determines if an input value (i.e., target variant 1862) will be classified as an output of 0 or 1 (e.g., a decision threshold boundary of 0.5 leads to values in the range $\{0,0.4\}$ generating an output of 0 and values in the range $\{0.5,1\}$ generating an output of 1). Determination of the optimal decision threshold boundary may be determined on the basis of optimization of a particular performance metric when training the logistic regression model, such as accuracy, precision, recall, or a particular error function. The binary output values 0 and 1 are assigned to two output classes, High Quality 1866 or Low Quality 1868.

Figure 19:
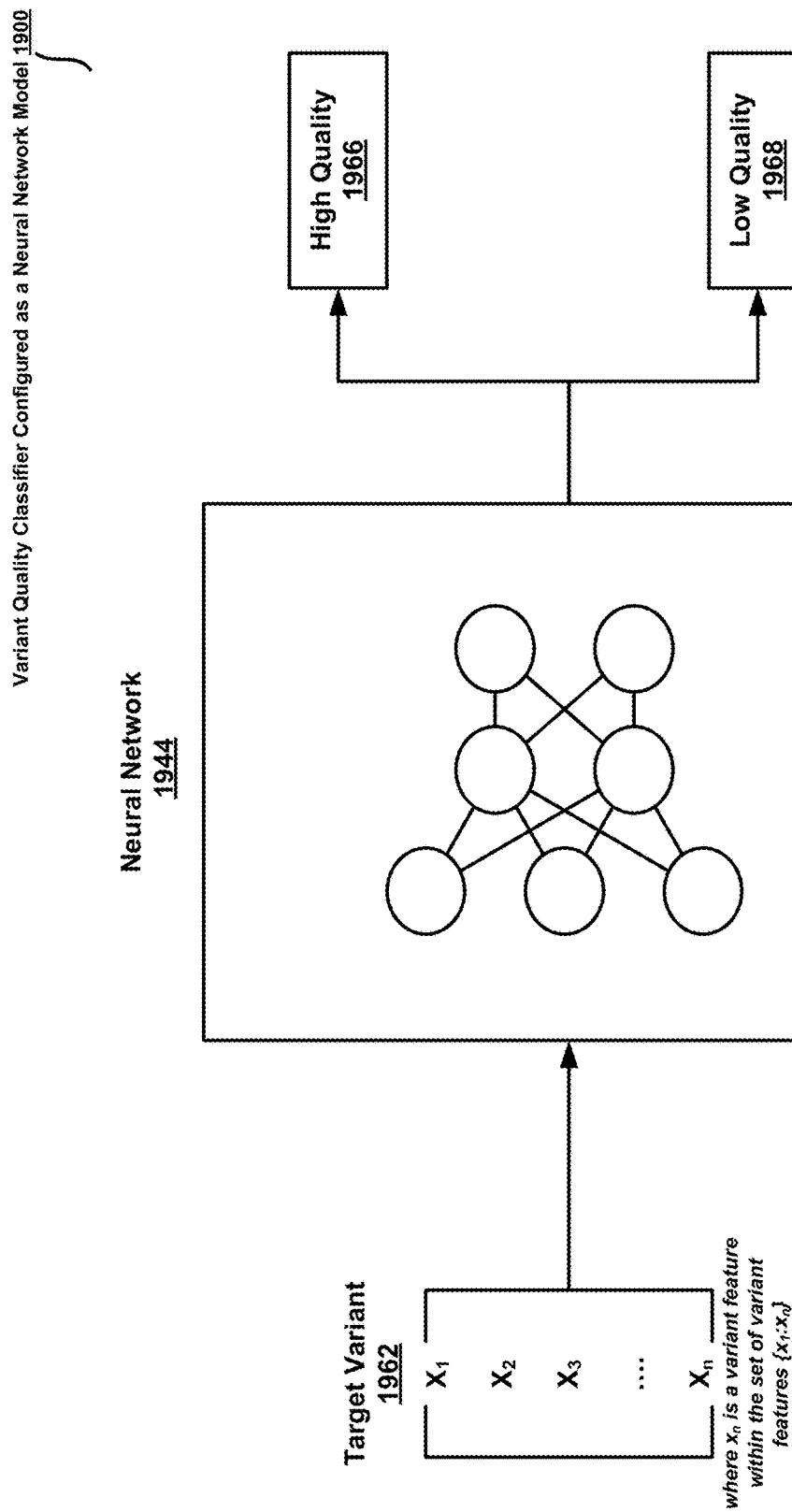
FIG. 19 is an illustrated flow diagram representing the variant quality classifier configured as a neural network model to classify a target variant as either belonging to the high quality class or the low quality class.

FIG. 19 is an illustrated flow diagram 1900 representing the variant quality classifier configured as a neural network to classify a Target Variant 1962 as either belonging to the High Quality Class 1966 or the Low Quality Class 1968. The Quality Classifier 1944 takes an Input Target Variant 1962 represented as a vector containing the set of variant features in the plurality of variant features $\{x_1:x_n\}$ where each value of x is a variant feature within the set of variant features in the plurality of variant features describing the Target Variant 1962 and generates a classification from Neural Network 1944. The neural network model processes the Input Target Variant 1962 via a series of connected layers of nodes which each perform a respective weighted data transformation. Backpropagation through the network updates the weights of each node iteratively during the training process and the final trained model generates an output belonging to the High Quality Class 1966 or Low Quality Class 1968 for the Input Target Variant 1962. At this stage, variants identified as high quality or low quality undergo may further filtering steps in certain embodiments, as described further below.

Unique Mapper

Figure 20:
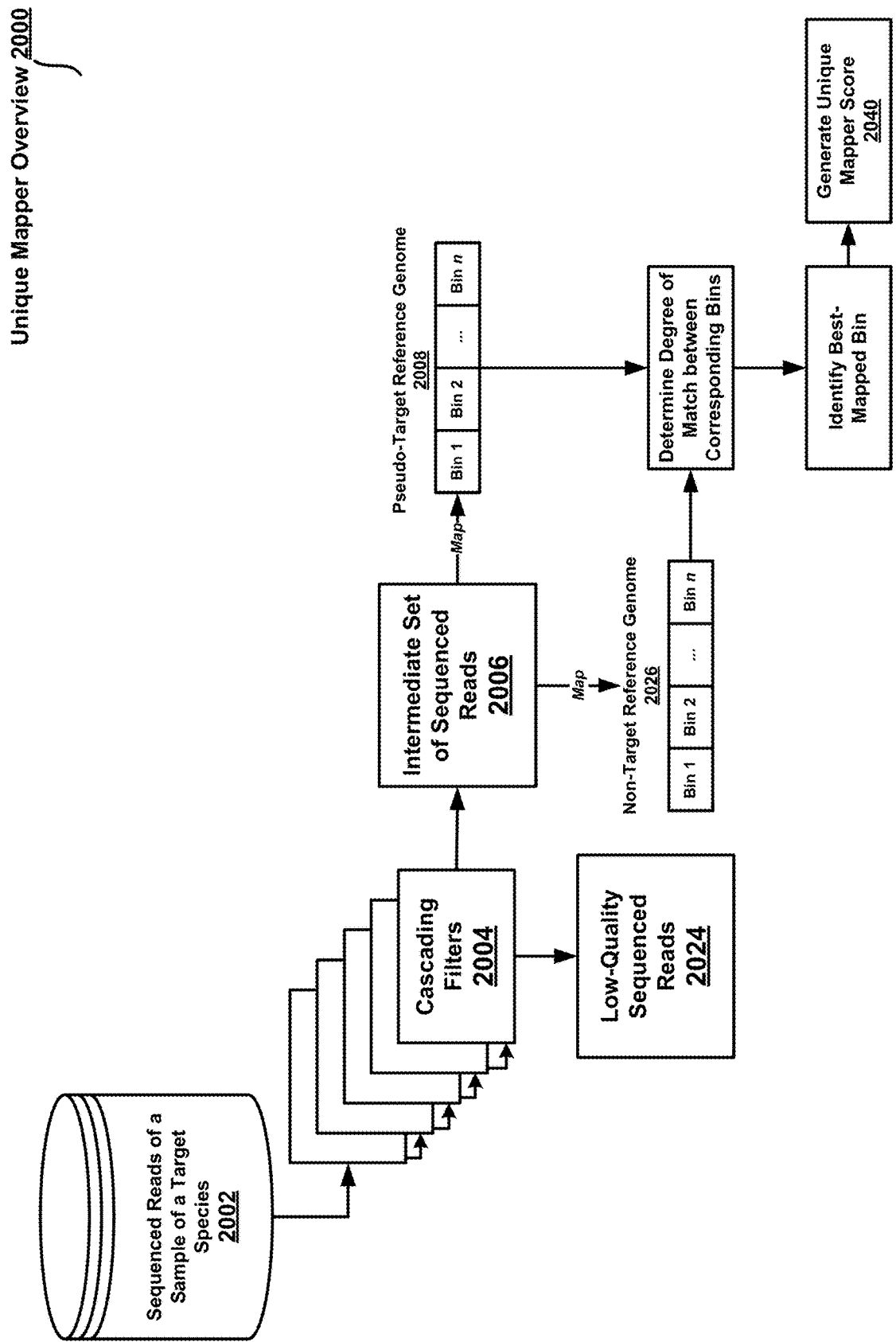
FIG. 20 is a flow diagram of the unique mapper overview process to further improve the quality of a set of called variants following variant calling or machine learning variant classification.

FIG. 20 is a flow diagram 2000 of the unique mapper overview process to further improve the quality of a set of called variants following variant calling or machine learning variant classification. Sequenced Reads of a Sample of a Target Species 2002 undergo a filtering process via Cascading Filters 2004 to remove Low Quality Sequenced Reads 2024. The sequencing data may be obtained from Binary Alignment Map (.bam) files. The series of Cascading Filters 2004 comprise filters that remove variants with incorrect codon match between primates and humans, remove variants with annotation errors, gene-specific filters (e.g., skewed distribution of variant machine learning classifier quality scores compared with exomewide scores or deviations from the Hardy-Weinberg equilibrium), and removal of variants that do not meet a particular machine learning classifier performance metric threshold. The resulting Intermediate Set of Sequenced Reads 2006 is mapped to a Pseudo-Target Reference Genome 2008 and to a Non-Target Reference Genome 2026. The Pseudo-Target Reference Genome 2008 is divided into a number of bins (i.e., sequential nonoverlapping genomic regions of specified equal length). The Non-Target Reference Genome 2026 is also divided into an equivalent number of bins of equivalent size in comparison to the Pseudo-Target Reference Genome 2008 bins. Bins are compared on a one-to-one basis to determine the degree of mapping homology between corresponding bins. The best-mapped bin is identified as the bin wherein the degree of match (i.e., alignment between mapped genome for the bin) and used to generate a Unique Mapper Score 2040. In one embodiment of the technology disclosed, The Unique Mapper Score 2040 is unique for each specific sample, and the Unique Mapper Scores across all samples to a specific reference target species are averaged to obtain a single mean Unique Mapper Score which applies to all variants of the reference target species that fall into each respective bin.

Figure 21:
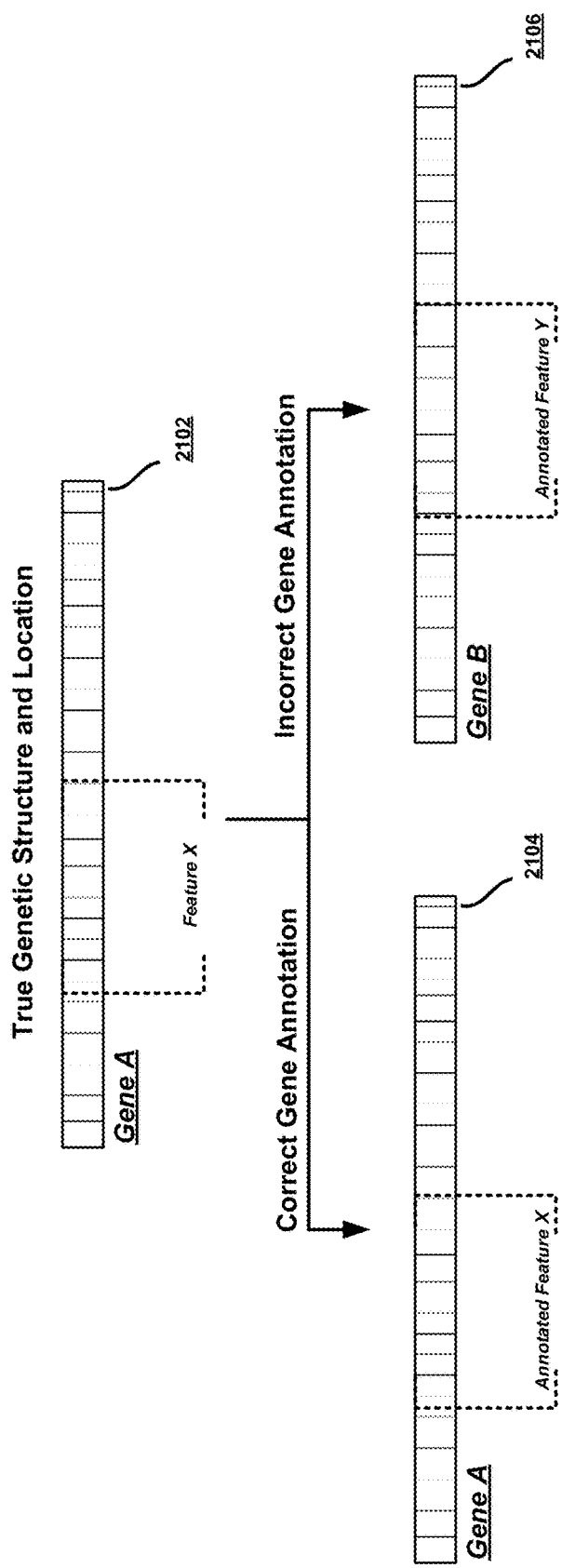
FIG. 21 schematically illustrates the gene annotation filter in the series of cascaded filters for variant quality filtering.

FIG. 21 schematically illustrates the Gene Annotation Filter 2100 in the series of cascaded filters for variant quality filtering. Gene annotation includes the labeling of a genome for features such as gene location, coding and non-coding regions, and various descriptors of genetic function. Incorrect gene annotation can lead to error in the variant calling process. Gene A 2102 is located at a genomic region and includes Feature X at a specific location within its structure. Gene A 2104 is the correct gene annotation of Gene A 2102 wherein the genomic structure is correctly annotated with Feature X properly located. Gene B 2106 is in a different location and contains different structure (i.e., contains Feature Y rather than Feature X). In a case of incorrect gene annotation by gene prediction error, Gene A 2102 may be incorrectly annotated as Gene B 2106. As a result, any resulting mapping to Gene B 2106 (i.e., despite being labeled as Gene B, the genomic sequence belongs to Gene A) is erroneous. Called variants mapped to genes with annotation errors are filtered out.

Figure 22:
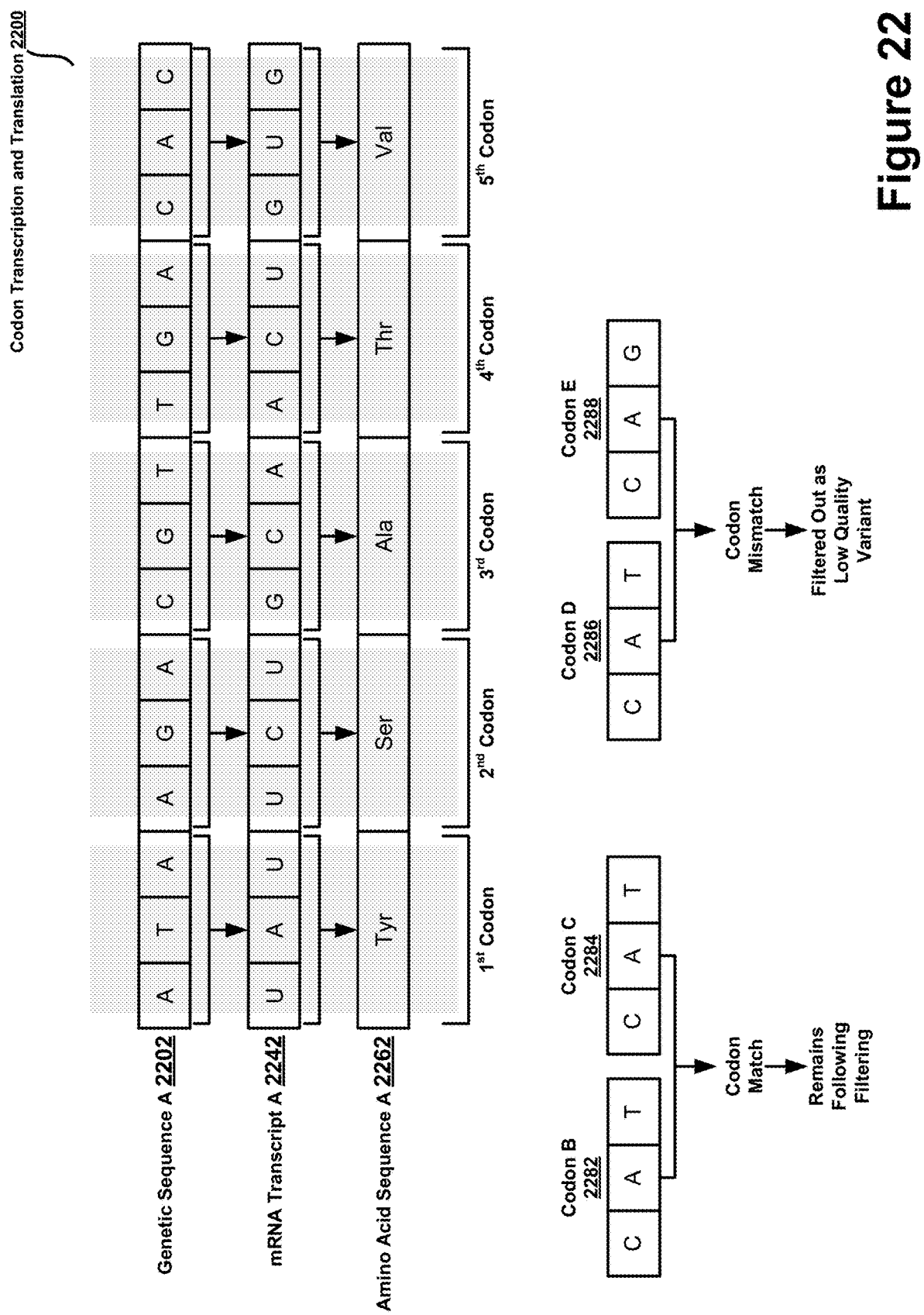
FIG. 22 schematically illustrates the process codon transcription and translation and filtering for codon match.

FIG. 22 schematically illustrates the process 2200 codon transcription and translation and filtering for codon match. Genetic Sequence A 2202 consists of nucleic acids. The nucleic acid sequence in Genetic Sequence A 2202 undergoes transcription to generate mRNA Transcript A 2242. Following transcription, mRNA Transcript A 2242 is translated to generate Amino Acid Sequence A 2262. Each amino acid is translated from a three nucleic acid sequence referred to as a codon as highlighted by grey shaded boxes for five total codons across Genetic Sequence A 2202, mRNA Transcript A 2242, and Amino Acid Sequence A 2262. Codon B 2282 and Codon C 2284 contain identical nucleic acids and will therefore be transcribed and translated into the same amino acid. If a non-target reference genome contained Codon B 2282 and a pseudo-target reference genome contained Codon C 2284 at the same aligned position, these codons would match and the codon mismatch filter would not remove called variants that align to the genomic region corresponding to Codon B 2282 and Codon C 2284. Codon D 2286 and Codon E 2288 differ in the third nucleic acid position and will not transcribe and translate to the same amino acid. If a non-target reference genome contained Codon D 2286 and a pseudo-target reference genome contained Codon E 2288 at the same aligned position, these aligned codons would not match and called variants that align to the genomic region corresponding to Codon D 2286 and Codon E 2288 are filtered out.

Figure 23:
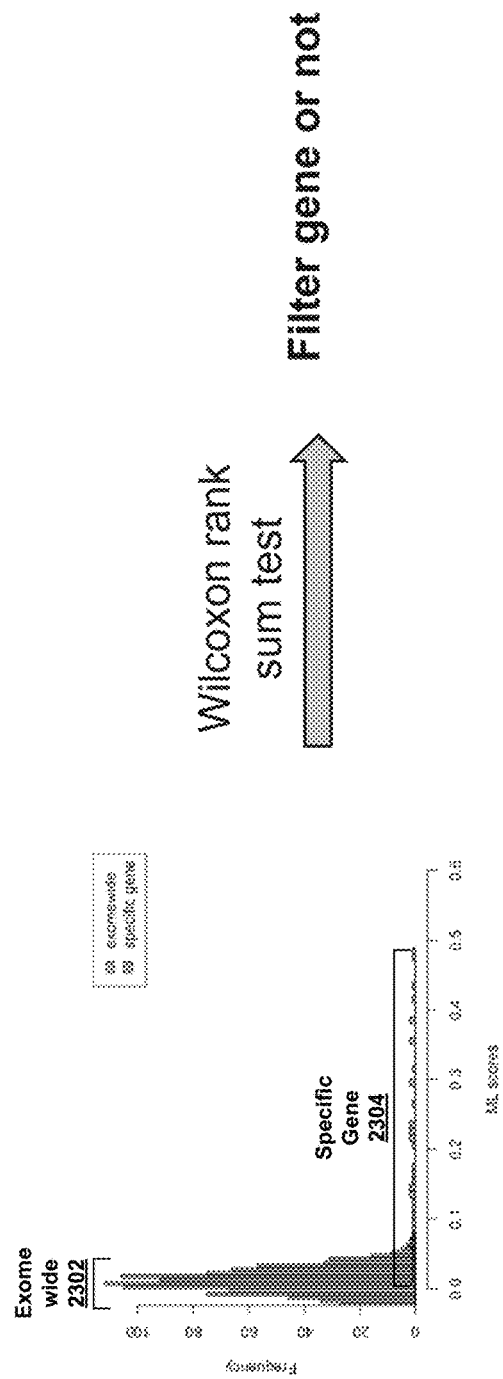
FIG. 23 illustrates the process of filtering genes based on a distribution of machine learning scores.

FIG. 23 illustrates the process 2300 of filtering genes based on a distribution of machine learning scores. Scores from a variant quality classifier are plotted on a graph measuring frequency for both a Specific Gene 2304 and Exomewide 2302. A Wilcoxon rank sum test determines if the Specific Gene distribution 2304 is skewed in comparison to the Exomewide Distribution 2303 via significance testing for the probability of a randomly selected machine learning score from the Specific Gene Distribution 2304 being greater than a randomly selected machine learning score from the Exomewide Distribution 2302 is equivalent to the probability of a randomly selected machine learning score from the Exomewide Distribution 2302 being greater than a randomly selected machine learning score from the Specific Gene Distribution 2304. Called variants mapped to genes that are determined to be skewed in contrast to the Exomewide Distribution 2302 are filtered out. Determination of skewedness when comparing the Exomewide Distribution 2302 and the Specific Gene Distribution 2304 identifies the gene as an outlier with potential error.

Figure 24:
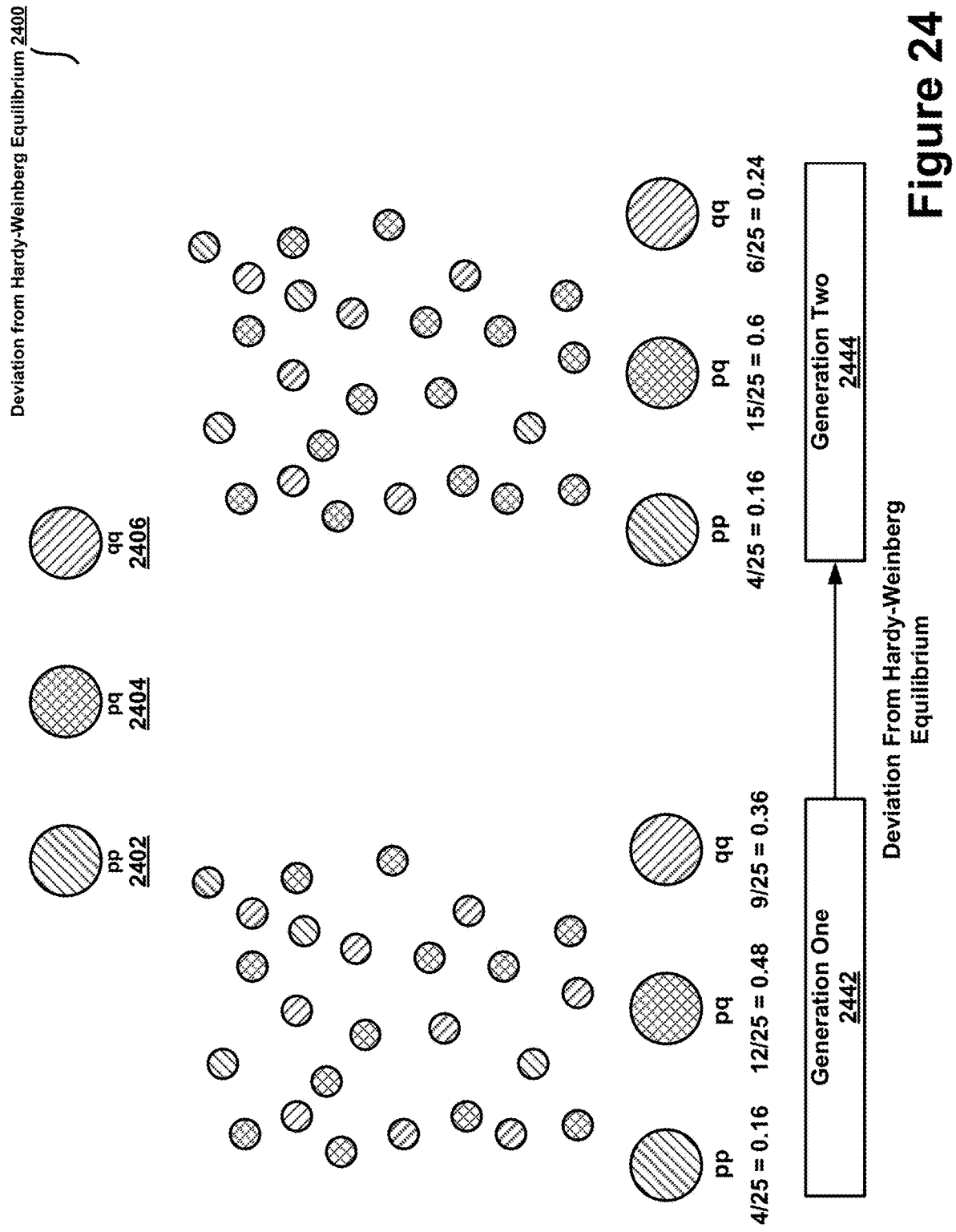
FIG. 24 illustrates deviation from Hardy-Weinberg Equilibrium in an example population.

FIG. 24 illustrates deviation from Hardy-Weinberg Equilibrium in an example population 2400. A filter within the Cascading Filters 2004 removes variants that deviate from the Hardy-Weinberg Equilibrium. Dominant alleles are represented by the letter 'p' and recessive alleles are represented by the letter 'q'. Homozygous dominant genotypes (i.e., 'pp'; 2402) are represented by upward diagonal shaded circles. Heterozygous genotypes ('pq'; 2404) are represented by diamond crosshatched circles. Homozygous recessive genotypes ('qq'; 2406) are represented by downward diagonal shaded circles. The population shown includes 25 samples with respective genotypes. In Generation One 2442, each genotype has respective frequencies counted as the proportion of the respective genotype to the total population count. In Generation Two 2444, each genotype has updated respective frequencies counted as the proportion of the respective genotype to the total population count. Populations with unchanged genotype frequencies in sequential generations are considered to be in Hardy-Weinberg Equilibrium. The genotype frequencies for the example population shown in FIG. 24 are different in Generation Two 2444 from Generation One 2442 therefore the population deviates from the Hardy-Weinberg Equilibrium. Deviations from the Hardy-Weinberg Equilibrium can result in overcalling of heterozygous genotypes and as a result, called variants mapped to genes that are not in Hardy-Weinberg Equilibrium as determined by large population databases are filtered out.

FIG. 25 is an illustration 2500 of a nonsense variant. A filter within the Cascading Filters 2004 removes nonsense variants. Nonsense variants, also referred to as 'stop gain variants', result from single nucleotide polymorphisms which change a codon sequence such that a previously amino acid-translating codon will translate to a stop codon as a result of the novel mutated amino acid sequence. Premature stop codons prevent the remainder of the mRNA transcript from being translated and as a result the amino acid sequence is terminated early. Genetic Sequence B 2502 is transcribed to mRNA Transcript B 2522 and mRNA Transcript B 2522 is translated into Amino Acid Sequence B 2542 for a total of five codons. Single Nucleotide Polymorphism 2540 at position 12 results in a change from a guanine nucleic acid to a thymine nucleic acid. As a result, the fourth codon has changed from ACG to ACT and will subsequently be transcribed to a stop codon rather than being transcribed and translated to a cysteine amino acid residue. The premature stop codon ends translation and the fifth codon will never be translated.

Figure 26:
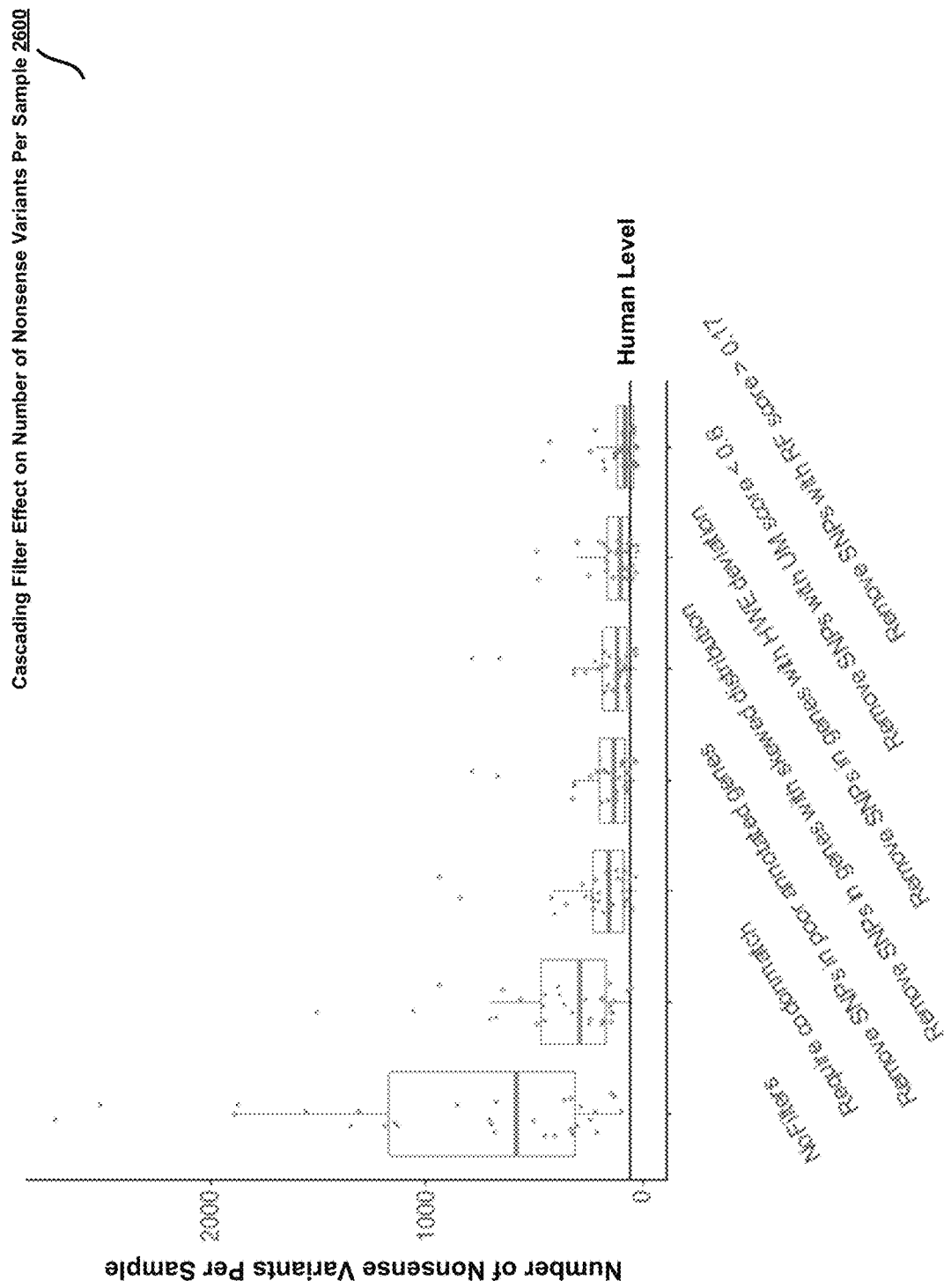
FIG. 26 contains a graph of collected results demonstrating the cascading filter effect on the number of nonsense variants per sample.

FIG. 26 contains a graph 2600 of collected results demonstrating the cascading filter effect on number of nonsense variants per sample. In one implementation of the technology disclosed, number of nonsense variants per sample is compared between samples from non-human primate species and human. No filtering of the called variants from samples from non-human primate species results in a significantly higher number of nonsense variants per sample as compared to the corresponding human level of nonsense variants per sample. The called variants from samples from non-human primate species undergo cascaded filters including a codon match filter, gene annotation error filter, machine learning distribution skew filter, Hardy-Weinberg Equilibrium deviation filter, Unique Mapper filter (called variants with Unique Mapper scores less than 0.6 removed), and random forest score filter (called variants with a random forest score greater than 0.17 removed). Boxplots showing the average number of stop-gained variants per sample of each primate reference species was gradually reduced to close to human level after a series of variant filtering steps, including requiring codon-match, removing SNPs in poorly-annotated genes or in genes with skewed random forest (RF) score distribution or deviating from Hardy Weinberg equilibrium, and removing SNPs with unique-mapper score <0.6 or RF score >0.17. Each dot represents the average number of stop-gained variants of each primate reference species. The horizontal line shows the average number of stop-gained variants of human samples from Platinum genome project.

Figure 27:
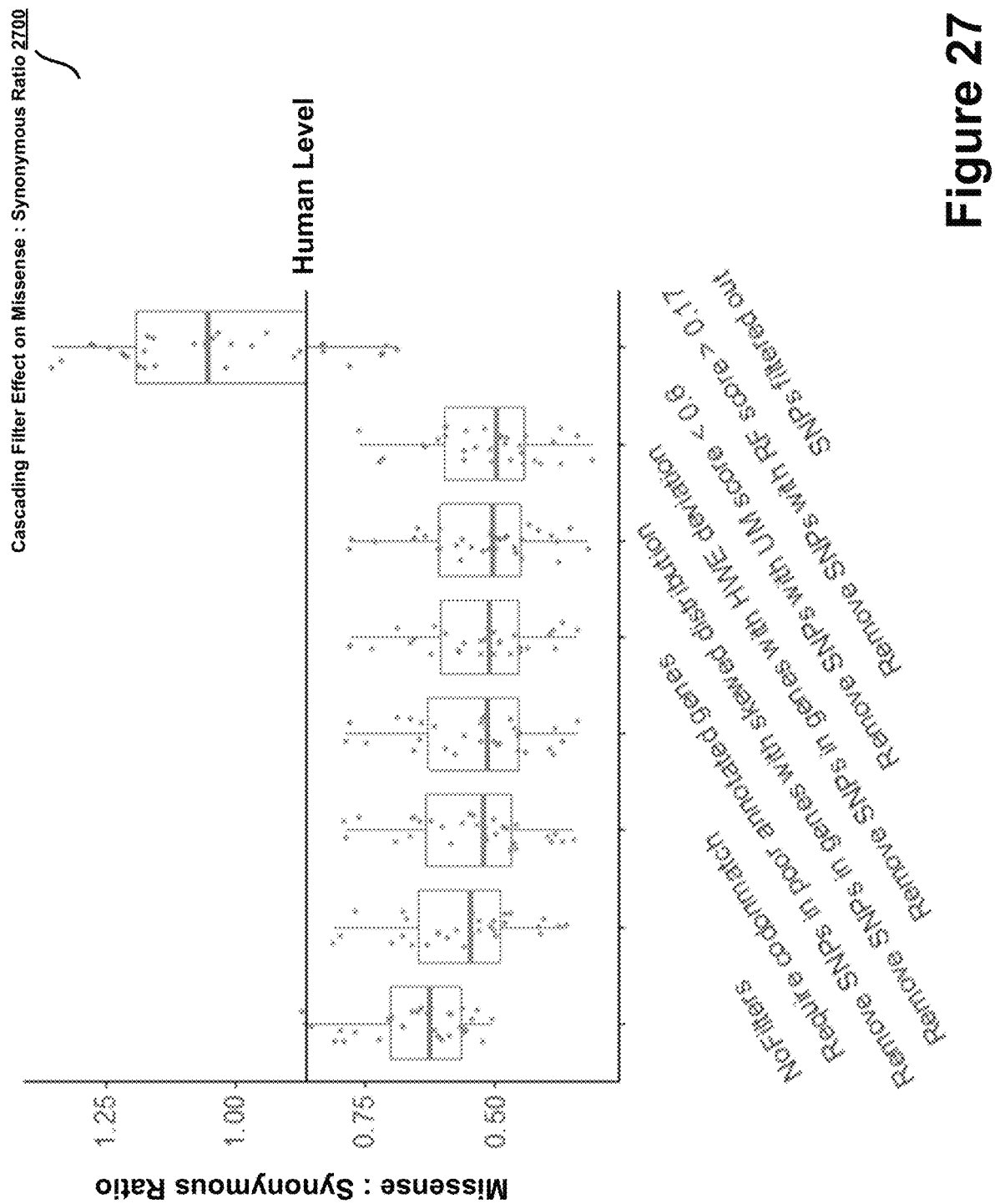
FIG. 27 contains a graph of collected results demonstrating the cascading filter effect on missense: synonymous ratio of called variants per sample.

FIG. 27 contains a graph 2700 of collected results demonstrating the cascading filter effect on missense: synonymous ratio of called variants per sample. In one implementation of the technology disclosed, missense: synonymous ratio (MSR; the ratio used to estimate the balance of benign and pathogenic variants present within a particular cohort) is compared between samples from non-human primate species and human. The called variants from samples from non-human primate species undergo cascaded filters including a codon match filter, gene annotation error filter, machine learning distribution skew filter, Hardy-Weinberg Equilibrium deviation filter, Unique Mapper filter (called variants with Unique Mapper scores less than 0.6 removed), and random forest score filter (called variants with a random forest score greater than 0.17 removed). Boxplots showing missense: synonymous ratios decreased after variant filtering steps. Each dot represents the MSR of each primate reference species. The black line represents MSR of human samples.

Figure 28:
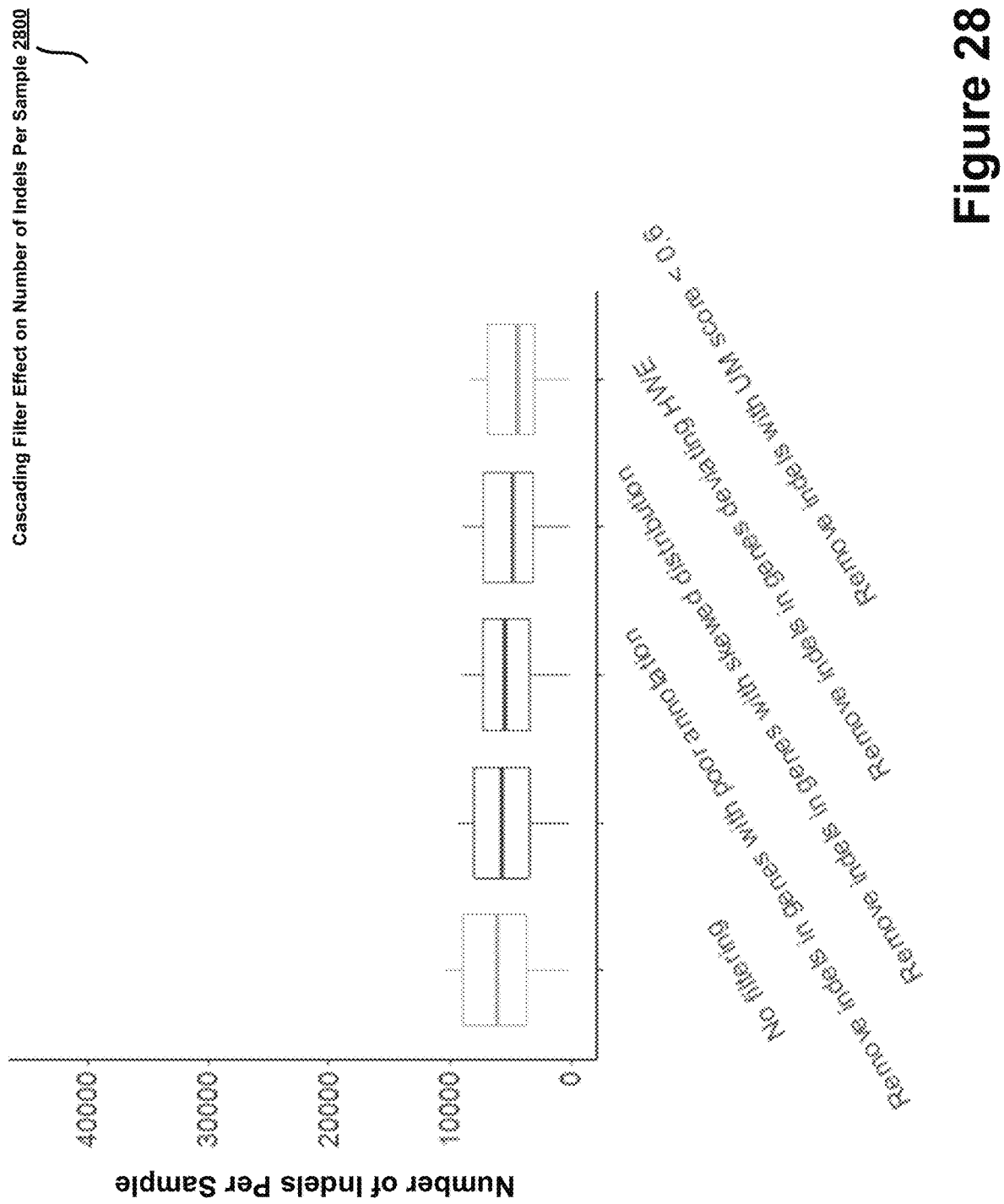
FIG. 28 contains a graph of collected results demonstrating the cascading filter effect on number of insertion-deletion variants (indels) per sample.

FIG. 28 contains a graph 2800 of collected results demonstrating the cascading filter effect on number of insertion-deletion variants (indels) per sample. The called variants from samples from non-human primates undergo cascading filters including a gene annotation error filter, machine learning distribution skew filter, Hardy-Weinberg Equilibrium deviation filter, and Unique Mapper filter (called variants with Unique Mapper scores less than 0.6 removed). The average number of indels per sample of each primate reference species diminished after filtering steps.

Computer System

Figure 29:
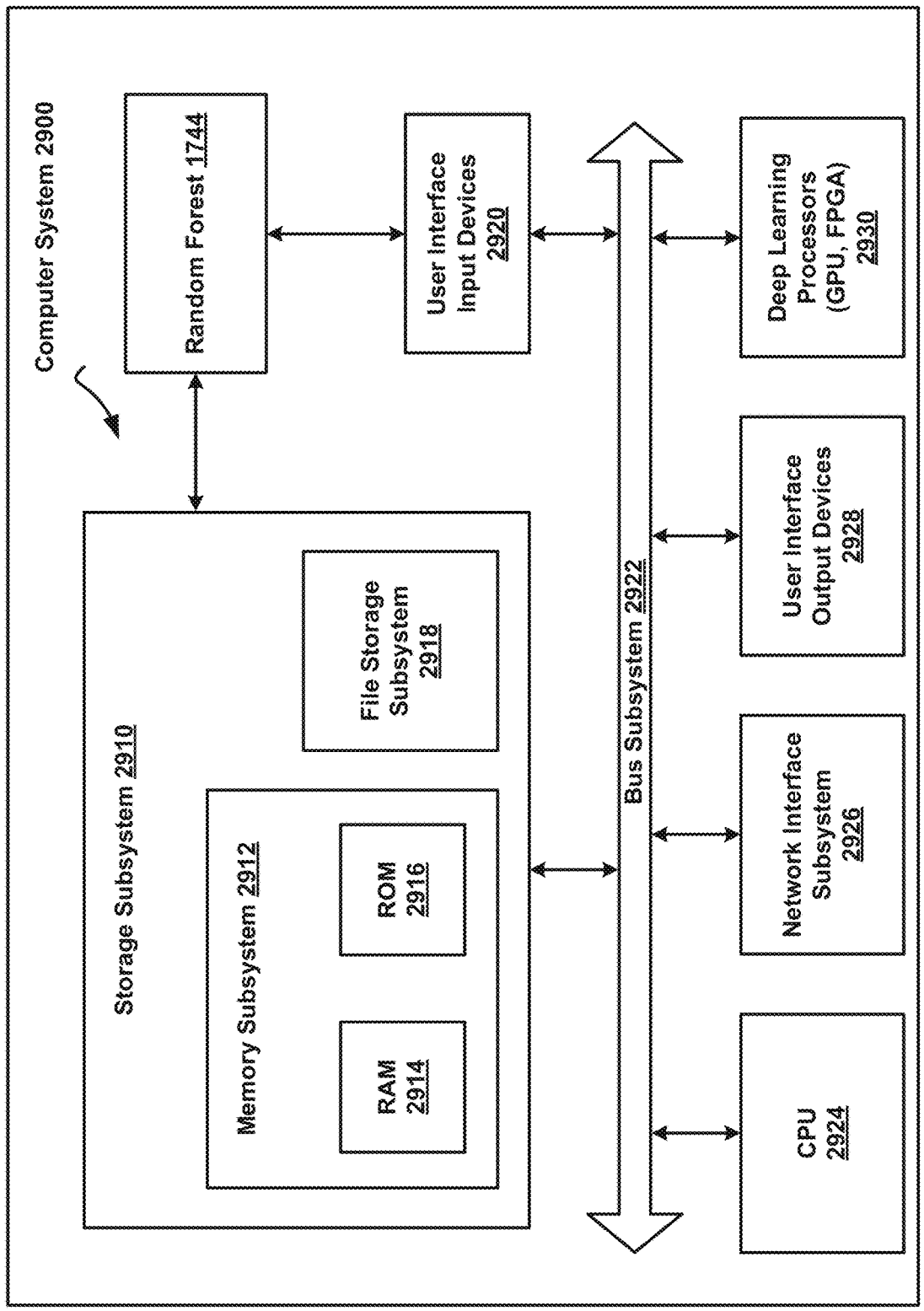
FIG. 29 shows an example computer system that can be used to implement the technology disclosed.

FIG. 29 shows an example computer system 2900 that can be used to implement the technology disclosed. Computer system 2900 includes at least one central processing unit (CPU) 2972 that communicates with a number of peripheral devices via bus subsystem 2955. These peripheral devices can include a storage subsystem 2910 including, for example, memory devices and a file storage subsystem 2936, user interface input devices 2938, user interface output devices 2976, and a network interface subsystem 2974. The input and output devices allow user interaction with computer system 2900. Network interface subsystem 2974 provides an interface to outside networks, including an interface to corresponding interface devices in other computer systems.

In one implementation, the random forest model 1744 is communicably linked to the storage subsystem 2910 and the user interface input devices 2938.

User interface input devices 2938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2900.

User interface output devices 2976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2900 to the user or to another machine or computer system.

Storage subsystem 2910 stores programming and data constructs that provide the functionality of some or all of the modules and methods described herein. These software modules are generally executed by processors 2978.

Processors 2978 can be graphics processing units (GPUs), field-programmable gate arrays (FPGAs), application-specific integrated circuits (ASICs), and/or coarse-grained reconfigurable architectures (CGRAs). Processors 2978 can be hosted by a deep learning cloud platform such as Google Cloud Platform™, Xilinx™, and Cirrascale™. Examples of processors 2978 include Google's Tensor Processing Unit (TPU)™, rackmount solutions like GX4 Rackmount Series™, GX29 Rackmount Series™, NVIDIA DGX-1™, Microsoft™ Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 2922 used in the storage subsystem 2910 can include a number of memories including a main random access memory (RAM) 2932 for storage of instructions and data during program execution and a read only memory (ROM) 2934 in which fixed instructions are stored. A file storage subsystem 2936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2936 in the storage subsystem 2910, or in other machines accessible by the processor.

Bus subsystem 2955 provides a mechanism for letting the various components and subsystems of computer system 2900 communicate with each other as intended. Although bus subsystem 2955 is shown schematically as a single bus, alternative implementations of the bus subsystem can use multiple busses.

Computer system 2900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2900 depicted in FIG. 29 is intended only as a specific example for purposes of illustrating the preferred implementations of the present invention. Many other configurations of computer system 2900 are possible having more or less components than the computer system depicted in FIG. 29.

Clauses

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A system, comprising:
  a variant quality classifier configured to process a plurality of features of a target variant, and generate a quality indication for the target variant,
  wherein the variant quality classifier is trained on a set of high-quality variants and a set of low-quality variants,
  wherein high-quality variants in the set of high-quality variants are identified as true positive variants that are common between a first set of variants and a second set of variants,
  wherein low-quality variants in the set of low-quality variants are identified as false positive variants that are present in the second set of variants but absent from the first set of variants,
  wherein the first set of variants is detected by variant calling sequenced reads of a sample of a target species against a reference genome of a non-target species, and
  wherein the second set of variants is detected by variant calling the sequenced reads of the sample of the target species against a reference genome of a pseudo-target species.

2. The system of clause 1, wherein the variant quality classifier is a random forest model.

3. The system of clause 1, wherein the variant quality classifier is a logistic regression model.

4. The system of clause 1, wherein the variant quality classifier is a neural network model.

5. The system of clause 1, wherein a feature in the plurality of features of the target variant is a guanine-cytosine (GC) content within the sequenced reads of the target variant.

6. The system of clause 1, wherein a feature in the plurality of features of the target variant is a guanine-cytosine (GC) skew within the sequenced reads of the target variant, wherein the GC skew represents a normalized excess of cytosine over guanine in a given sequenced read of the target variant.

7. The system of clause 1, wherein a feature in the plurality of features of the target variant is a local composition complexity within one hundred base pairs upstream or downstream of the target variant.

8. The system of clause 1, wherein a feature in the plurality of features of the target variant is an allelic count of the sequenced reads of the target variant.

9. The system of clause 1, wherein a feature in the plurality of features of the target variant is a mapping quality of the sequenced reads of the target variant.

10. The system of clause 1, wherein a feature in the plurality of features of the target variant is a p-value of Fisher's exact test to detect strand bias in the sequenced reads of the target variant.

11. The system of clause 1, wherein a feature in the plurality of features of the target variant is a symmetric odds ratio to detect strand bias in the sequenced reads of the target variant.

12. The system of clause 1, wherein a feature in the plurality of features of the target variant is a variant quality by depth of the sequenced reads of the target variant.

13. The system of clause 1, wherein a feature in the plurality of features of the target variant is a genotype quality of the sequenced reads of the target variant.

14. The system of clause 1, wherein a feature in the plurality of features of the target variant is a read depth of the target variant normalized by a mean coverage of the sequenced reads of the target variant.

15. The system of clause 1, wherein a feature in the plurality of features of the target variant is a fraction alternative allele read depth out of a target variant coverage of the sequenced reads of the target variant.

16. The system of clause 1, wherein a feature in the plurality of features of the target variant is an existence of insertion and/or deletion (indel) mutations within five base pairs upstream or downstream of the sequenced reads of the target variant.

17. The system of clause 1, wherein a feature in the plurality of features of the target variant is an existence of insertion and/or deletion (indel) mutations within ten base pairs upstream or downstream of the sequenced reads of the target variant.

18. The system of clause 1, wherein a feature in the plurality of features of the target variant is a mean coverage of flanking regions one hundred base pairs upstream or downstream of the sequenced reads of the target variant normalized by the mean coverage of the sequenced reads of the target variant.

19. The system of clause 1, wherein a feature in the plurality of features of the target variant is a mean coverage of flanking regions five hundred base pairs upstream or downstream of the sequenced reads of the target variant normalized by the mean coverage of the sequenced reads of the target variant.

20. The system of clause 1, wherein a feature in the plurality of features of the target variant is a number of heterozygote single nucleotide polymorphisms within one hundred base pairs upstream or downstream of the sequenced reads of the target variant normalized by a median count of variants within the same length regions of the sequenced reads of the target variant.

21. The system of clause 1, wherein a feature in the plurality of features of the target variant is a number of heterozygote single nucleotide polymorphisms within five hundred base pairs upstream or downstream of the sequenced reads of the target variant normalized by a median count of variants within the same length regions of the sequenced reads of the target variant.

22. The system of clause 1, wherein a feature in the plurality of features of the target variant is a number of homozygote single nucleotide polymorphisms within one hundred base pairs upstream or downstream of the sequenced reads of the target variant normalized by a median count of variants within the same length regions of the sequenced reads of the target variant.

23. The system of clause 1, wherein a feature in the plurality of features of the target variant is a number of homozygote single nucleotide polymorphisms within five hundred base pairs upstream or downstream of the sequenced reads of the target variant normalized by a median count of variants within the same length regions of the sequenced reads of the target variant.

24. The system of clause 1, wherein a feature in the plurality of features of the target variant is a number of alternate homozygote single nucleotide polymorphisms within one hundred base pairs upstream or downstream of the sequenced reads of the target variant normalized by a median count of variants within the same length regions of the sequenced reads of the target variant.

25. The system of clause 1, wherein a feature in the plurality of features of the target variant is a number of alternate homozygote single nucleotide polymorphisms within five hundred base pairs upstream or downstream of the sequenced reads of the target variant normalized by a median count of variants within the same length regions of the sequenced reads of the target variant.

26. A computer-implemented method of processing a plurality of features of a target variant, and generate a quality indication for the target variant, including:
training a variant quality classifier on a set of high-quality variants and a set of low-quality variants;
identifying high-quality variants in the set of high-quality variants as true positive variants that are common between a first set of variants and a second set of variants;
identifying low-quality variants in the set of low-quality variants as false positive variants that are present in the second set of variants but absent from the first set of variants;
detecting the first set of variants by variant calling sequenced reads of a sample of a target species against a reference genome of a non-target species, and
detecting the second set of variants by variant calling the sequenced reads of the sample of the target species against a reference genome of a pseudo-target species.

27. The computer-implemented method of clause 26, wherein the variant quality classifier is a random forest model.

28. The computer-implemented method of clause 26, wherein the variant quality classifier is a logistic regression model.

29. The computer-implemented method of clause 26, wherein the variant quality classifier is a neural network model.

30. The computer-implemented method of clause 26, wherein a feature in the plurality of features of the target variant is a guanine-cytosine (GC) content within the sequenced reads of the target variant.

31. The computer-implemented method of clause 26, wherein a feature in the plurality of features of the target variant is a guanine-cytosine (GC) skew within the sequenced reads of the target variant,
wherein the GC skew represents a normalized excess of cytosine over guanine in a given sequenced read of the target variant.

32. The computer-implemented method of clause 26, wherein a feature in the plurality of features of the target variant is a local composition complexity within one hundred base pairs upstream or downstream of the target variant.

33. The computer-implemented method of clause 26, wherein a feature in the plurality of features of the target variant is an allelic count of the sequenced reads of the target variant.

34. The computer-implemented method of clause 26, wherein a feature in the plurality of features of the target variant is a mapping quality of the sequenced reads of the target variant.

35. The computer-implemented method of clause 26, wherein a feature in the plurality of features of the target variant is a p-value of Fisher's exact test to detect strand bias in the sequenced reads of the target variant.

36. The computer-implemented method of clause 26, wherein a feature in the plurality of features of the target variant is a symmetric odds ratio to detect strand bias in the sequenced reads of the target variant.

37. The computer-implemented method of clause 26, wherein a feature in the plurality of features of the target variant is a variant quality by depth of the sequenced reads of the target variant.

38. The computer-implemented method of clause 26, wherein a feature in the plurality of features of the target variant is a genotype quality of the sequenced reads of the target variant.

39. The computer-implemented method of clause 26, wherein a feature in the plurality of features of the target variant is a read depth of the target variant normalized by a mean coverage of the sequenced reads of the target variant.

40. The computer-implemented method of clause 26, wherein a feature in the plurality of features of the target variant is a fraction alternative allele read depth out of a target variant coverage of the sequenced reads of the target variant.

41. The computer-implemented method of clause 26, wherein a feature in the plurality of features of the target variant is an existence of insertion and/or deletion (indel) mutations within five base pairs upstream or downstream of the sequenced reads of the target variant.

42. The computer-implemented method of clause 26, wherein a feature in the plurality of features of the target variant is an existence of insertion and/or deletion (indel) mutations within ten base pairs upstream or downstream of the sequenced reads of the target variant.

43. The computer-implemented method of clause 26, wherein a feature in the plurality of features of the target variant is a mean coverage of flanking regions one hundred base pairs upstream or downstream of the sequenced reads of the target variant normalized by the mean coverage of the sequenced reads of the target variant.

44. The computer-implemented method of clause 26, wherein a feature in the plurality of features of the target variant is a mean coverage of flanking regions five hundred base pairs upstream or downstream of the sequenced reads of the target variant normalized by the mean coverage of the sequenced reads of the target variant.

45. The computer-implemented method of clause 26, wherein a feature in the plurality of features of the target variant is a number of heterozygote single nucleotide polymorphisms within one hundred base pairs upstream or downstream of the sequenced reads of the target variant normalized by a median count of variants within the same length regions of the sequenced reads of the target variant.

46. The computer-implemented method of clause 26, wherein a feature in the plurality of features of the target variant is a number of heterozygote single nucleotide polymorphisms within five hundred base pairs upstream or downstream of the sequenced reads of the target variant normalized by a median count of variants within the same length regions of the sequenced reads of the target variant.

47. The computer-implemented method of clause 26, wherein a feature in the plurality of features of the target variant is a number of homozygote single nucleotide polymorphisms within one hundred base pairs upstream or downstream of the sequenced reads of the target variant normalized by a median count of variants within the same length regions of the sequenced reads of the target variant.

48. The computer-implemented method of clause 26, wherein a feature in the plurality of features of the target variant is a number of homozygote single nucleotide polymorphisms within five hundred base pairs upstream or downstream of the sequenced reads of the target variant normalized by a median count of variants within the same length regions of the sequenced reads of the target variant.

49. The computer-implemented method of clause 26, wherein a feature in the plurality of features of the target variant is a number of alternate homozygote single nucleotide polymorphisms within one hundred base pairs upstream or downstream of the sequenced reads of the target variant normalized by a median count of variants within the same length regions of the sequenced reads of the target variant.

50. The computer-implemented method of clause 26, wherein a feature in the plurality of features of the target variant is a number of alternate homozygote single nucleotide polymorphisms within five hundred base pairs upstream or downstream of the sequenced reads of the target variant normalized by a median count of variants within the same length regions of the sequenced reads of the target variant.

51. A non-transitory computer readable storage medium impressed with computer program instructions to process a plurality of features of a target variant, and generate a quality indication for the target variant, the instructions, when executed on a processor, implement a method comprising:
a variant quality classifier trained on a set of high-quality variants and a set of low-quality variants,
wherein high-quality variants in the set of high-quality variants are identified as true positive variants that are common between a first set of variants and a second set of variants,
wherein low-quality variants in the set of low-quality variants are identified as false positive variants that are present in the second set of variants but absent from the first set of variants, wherein the first set of variants is detected by variant calling sequenced reads of a sample of a target species against a reference genome of a non-target species, and wherein the second set of variants is detected by variant calling the sequenced reads of the sample of the target species against a reference genome of a pseudo-target species.

52. The non-transitory computer readable storage medium of clause 51, wherein the variant quality classifier is a random forest model.

53. The non-transitory computer readable storage medium of clause 51, wherein the variant quality classifier is a logistic regression model.

54. The non-transitory computer readable storage medium of clause 51, wherein the variant quality classifier is a neural network model.

55. The non-transitory computer readable storage medium of clause 51, wherein a feature in the plurality of features of the target variant is a guanine-cytosine (GC) content within the sequenced reads of the target variant.

56. The non-transitory computer readable storage medium of clause 51, wherein a feature in the plurality of features of the target variant is a guanine-cytosine (GC) skew within the sequenced reads of the target variant,
wherein the GC skew represents a normalized excess of cytosine over guanine in a given sequenced read of the target variant.

57. The non-transitory computer readable storage medium of clause 51, wherein a feature in the plurality of features of the target variant is a local composition complexity within one hundred base pairs upstream or downstream of the target variant.

58. The non-transitory computer readable storage medium of clause 51, wherein a feature in the plurality of features of the target variant is an allelic count of the sequenced reads of the target variant.

59. The non-transitory computer readable storage medium of clause 51, wherein a feature in the plurality of features of the target variant is a mapping quality of the sequenced reads of the target variant.

60. The non-transitory computer readable storage medium of clause 51, wherein a feature in the plurality of features of the target variant is a p-value of Fisher's exact test to detect strand bias in the sequenced reads of the target variant.

61. The non-transitory computer readable storage medium of clause 51, wherein a feature in the plurality of features of the target variant is a symmetric odds ratio to detect strand bias in the sequenced reads of the target variant.

62. The non-transitory computer readable storage medium of clause 51, wherein a feature in the plurality of features of the target variant is a variant quality by depth of the sequenced reads of the target variant.

63. The non-transitory computer readable storage medium of clause 51, wherein a feature in the plurality of features of the target variant is a genotype quality of the sequenced reads of the target variant.

64. The non-transitory computer readable storage medium of clause 51, wherein a feature in the plurality of features of the target variant is a read depth of the target variant normalized by a mean coverage of the sequenced reads of the target variant.

65. The non-transitory computer readable storage medium of clause 51, wherein a feature in the plurality of features of the target variant is a fraction alternative allele read depth out of a target variant coverage of the sequenced reads of the target variant.

66. The non-transitory computer readable storage medium of clause 51, wherein a feature in the plurality of features of the target variant is an existence of insertion and/or deletion (indel) mutations within five base pairs upstream or downstream of the sequenced reads of the target variant.

67. The non-transitory computer readable storage medium of clause 51, wherein a feature in the plurality of features of the target variant is an existence of insertion and/or deletion (indel) mutations within ten base pairs upstream or downstream of the sequenced reads of the target variant.

68. The non-transitory computer readable storage medium of clause 51, wherein a feature in the plurality of features of the target variant is a mean coverage of flanking regions one hundred base pairs upstream or downstream of the sequenced reads of the target variant normalized by the mean coverage of the sequenced reads of the target variant.

69. The non-transitory computer readable storage medium of clause 51, wherein a feature in the plurality of features of the target variant is a mean coverage of flanking regions five hundred base pairs upstream or downstream of the sequenced reads of the target variant normalized by the mean coverage of the sequenced reads of the target variant.

70. The non-transitory computer readable storage medium of clause 51, wherein a feature in the plurality of features of the target variant is a number of heterozygote single nucleotide polymorphisms within one hundred base pairs upstream or downstream of the sequenced reads of the target variant normalized by a median count of variants within the same length regions of the sequenced reads of the target variant.

71. The non-transitory computer readable storage medium of clause 51, wherein a feature in the plurality of features of the target variant is a number of heterozygote single nucleotide polymorphisms within five hundred base pairs upstream or downstream of the sequenced reads of the target variant normalized by a median count of variants within the same length regions of the sequenced reads of the target variant.

72. The non-transitory computer readable storage medium of clause 51, wherein a feature in the plurality of features of the target variant is a number of homozygote single nucleotide polymorphisms within one hundred base pairs upstream or downstream of the sequenced reads of the target variant normalized by a median count of variants within the same length regions of the sequenced reads of the target variant.

73. The non-transitory computer readable storage medium of clause 51, wherein a feature in the plurality of features of the target variant is a number of homozygote single nucleotide polymorphisms within five hundred base pairs upstream or downstream of the sequenced reads of the target variant normalized by a median count of variants within the same length regions of the sequenced reads of the target variant.

74. The non-transitory computer readable storage medium of clause 51, wherein a feature in the plurality of features of the target variant is a number of alternate homozygote single nucleotide polymorphisms within one hundred base pairs upstream or downstream of the sequenced reads of the target variant normalized by a median count of variants within the same length regions of the sequenced reads of the target variant.

75. The non-transitory computer readable storage medium of clause 51, wherein a feature in the plurality of features of the target variant is a number of alternate homozygote single nucleotide polymorphisms within five hundred base pairs upstream or downstream of the sequenced reads of the target variant normalized by a median count of variants within the same length regions of the sequenced reads of the target variant.

What we claim is:

1. A system, comprising:
    a variant quality classifier configured to process a plurality of features of a target variant, and generate a quality indication for the target variant,
        wherein the variant quality classifier is trained on a set of high-quality variants and a set of low-quality variants,
        wherein high-quality variants in the set of high-quality variants are identified as true positive variants that are common between a first set of variants and a second set of variants,
        wherein low-quality variants in the set of low-quality variants are identified as false positive variants that are present in the second set of variants but absent from the first set of variants,
        wherein the first set of variants is detected by variant calling sequenced reads of a sample of a target species against a reference genome of a non-target species, and
        wherein the second set of variants is detected by variant calling the sequenced reads of the sample of the target species against a reference genome of a pseudo-target species.

2. The system of claim 1, wherein the variant quality classifier is a random forest model.

3. The system of claim 1, wherein the variant quality classifier is a logistic regression model.

4. The system of claim 1, wherein the variant quality classifier is a neural network model.

5. The system of claim 1, wherein a feature in the plurality of features of the target variant is a guanine-cytosine (GC) content within the sequenced reads of the target variant.

6. The system of claim 1, wherein a feature in the plurality of features of the target variant is a guanine-cytosine (GC) skew within the sequenced reads of the target variant,
    wherein the GC skew represents a normalized excess of cytosine over guanine in a given sequenced read of the target variant.

7. The system of claim 1, wherein a feature in the plurality of features of the target variant is a local composition complexity within one hundred base pairs upstream or downstream of the target variant.

8. The system of claim 1, wherein a feature in the plurality of features of the target variant is an allelic count of the sequenced reads of the target variant.

9. The system of claim 1, wherein a feature in the plurality of features of the target variant is a mapping quality of the sequenced reads of the target variant.

10. The system of claim 1, wherein a feature in the plurality of features of the target variant is a p-value of Fisher's exact test to detect strand bias in the sequenced reads of the target variant.

11. The system of claim 1, wherein a feature in the plurality of features of the target variant is a symmetric odds ratio to detect strand bias in the sequenced reads of the target variant.

12. The system of claim 1, wherein a feature in the plurality of features of the target variant is a variant quality by depth of the sequenced reads of the target variant.

13. The system of claim 1, wherein a feature in the plurality of features of the target variant is a genotype quality of the sequenced reads of the target variant.

14. The system of claim 1, wherein a feature in the plurality of features of the target variant is a read depth of the target variant normalized by a mean coverage of the sequenced reads of the target variant.

15. The system of claim 1, wherein a feature in the plurality of features of the target variant is a fraction alternative allele read depth out of a target variant coverage of the sequenced reads of the target variant.

16. The system of claim 1, wherein a feature in the plurality of features of the target variant is an existence of insertion and/or deletion (indel) mutations within five base pairs upstream or downstream of the sequenced reads of the target variant.

17. The system of claim 1, wherein a feature in the plurality of features of the target variant is an existence of insertion and/or deletion (indel) mutations within ten base pairs upstream or downstream of the sequenced reads of the target variant.

18. The system of claim 1, wherein a feature in the plurality of features of the target variant is a mean coverage of flanking regions one hundred base pairs upstream or downstream of the sequenced reads of the target variant normalized by the mean coverage of the sequenced reads of the target variant.

19. The system of claim 1, wherein a feature in the plurality of features of the target variant is a mean coverage of flanking regions five hundred base pairs upstream or downstream of the sequenced reads of the target variant normalized by the mean coverage of the sequenced reads of the target variant.

20. The system of claim 1, wherein a feature in the plurality of features of the target variant is a number of heterozygote single nucleotide polymorphisms within one hundred base pairs upstream or downstream of the sequenced reads of the target variant normalized by a median count of variants within the same length regions of the sequenced reads of the target variant.

21. The system of claim 1, wherein a feature in the plurality of features of the target variant is a number of heterozygote single nucleotide polymorphisms within five hundred base pairs upstream or downstream of the sequenced reads of the target variant normalized by a median count of variants within the same length regions of the sequenced reads of the target variant.

22. The system of claim 1, wherein a feature in the plurality of features of the target variant is a number of homozygote single nucleotide polymorphisms within one hundred base pairs upstream or downstream of the sequenced reads of the target variant normalized by a median count of variants within the same length regions of the sequenced reads of the target variant.

23. The system of claim 1, wherein a feature in the plurality of features of the target variant is a number of homozygote single nucleotide polymorphisms within five hundred base pairs upstream or downstream of the sequenced reads of the target variant normalized by a median count of variants within the same length regions of the sequenced reads of the target variant.

24. The system of claim 1, wherein a feature in the plurality of features of the target variant is a number of alternate homozygote single nucleotide polymorphisms within one hundred base pairs upstream or downstream of the sequenced reads of the target variant normalized by a median count of variants within the same length regions of the sequenced reads of the target variant.

25. The system of claim 1, wherein a feature in the plurality of features of the target variant is a number of alternate homozygote single nucleotide polymorphisms within five hundred base pairs upstream or downstream of the sequenced reads of the target variant normalized by a median count of variants within the same length regions of the sequenced reads of the target variant.

\* \* \* \* \*